United States Patent
Morimoto et al.

(10) Patent No.: US 7,513,245 B2
(45) Date of Patent: Apr. 7, 2009

(54) ENGINE TORQUE CONTROL APPARATUS AND METHOD FOR ADJUSTING ENGINE TORQUE CONTROL APPARATUS

(75) Inventors: Youhei Morimoto, Kariya (JP); Hiroshi Haraguchi, Kariya (JP); Kazuo Kojima, Nagoya (JP); Jyun Kawamura, Aichi-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/954,303

(22) Filed: Dec. 12, 2007

(65) Prior Publication Data
US 2008/0140298 A1    Jun. 12, 2008

(30) Foreign Application Priority Data
Dec. 12, 2006    (JP) ............................. 2006-334066

(51) Int. Cl.
F02B 47/08    (2006.01)
B60T 7/12    (2006.01)
(52) U.S. Cl. ............................. 123/568.11; 123/568.21; 701/108
(58) Field of Classification Search ............ 123/568.11, 123/568.15, 568.16, 568.21, 406.23, 434, 123/681; 701/103, 108
See application file for complete search history.

(56) References Cited
U.S. PATENT DOCUMENTS 6,736,120 B2 * 5/2004 Surnilla ...................... 123/674
7,234,436 B2 * 6/2007 Surnilla et al. ........ 123/198 DB
2003/0221682 A1 * 12/2003 Surnilla ...................... 123/688

FOREIGN PATENT DOCUMENTS
JP    H06-108824    4/1994

* cited by examiner

Primary Examiner—John T Kwon
(74) Attorney, Agent, or Firm—Nixon & Vanderhye PC

(57) ABSTRACT

An engine torque control apparatus is applied to an engine control system comprising an engine for rotating an output shaft by using torque generated through combustion in cylinders. In the apparatus, exhaust gas passing through an exhaust passage of the engine is partially recirculated into an intake passage of the engine. Also, variable control is conducted in the apparatus, when an air-fuel ratio indicating a proportion between air and fuel supplied into the cylinders of the engine is changed to a leaner air-fuel ratio, so that torque parameters for increasing/decreasing output torque of the engine can be variably controlled. As a result, torque fluctuation associated with a temporarily changing recirculated uncombusted fuel quantity can be cancelled in a manner suitable for the temporarily changing recirculated uncombusted fuel quantity, at least during a predetermined period immediately after timing for changing the air-fuel ratio.

16 Claims, 11 Drawing Sheets

ENGINE TORQUE CONTROL APPARATUS AND METHOD FOR ADJUSTING ENGINE TORQUE CONTROL APPARATUS

CROSS-REFERENCE TO RELATED APPLICATION

This application is based on and claims the benefit of priority from earlier Japanese Patent Application No. 2006-334066 filed Dec. 12, 2006, the description of which is incorporated herein by reference.

BACKGROUND OF THE INVENTION

1. Technical Field of the Invention

The present invention relates to an engine torque control apparatus used for controlling torque in an engine control system, and to a method for adjusting the engine torque control apparatus. In particular, the present invention relates to an engine torque control apparatus which can be appropriately applied to an engine control system provided, in particular, with an EGR (exhaust gas recirculation) system, and to a method for adjusting the engine torque control apparatus.

2. Related Art

As is well known, an EGR (exhaust gas recirculation) system generally includes an EGR passage for permitting communication between an intake passage and an exhaust passage of an engine, and an EGR valve for permitting channel areas to be variable in these passages. Generally, in such an engine control system having an EGR system, an ECU (electronic control unit), which is provided in the engine control system to mainly perform engine control, adjusts opening angle of the EGR valve to partially recirculate (return) the exhaust gas passing through the exhaust passage of the engine to the intake passage via the EGR passage. Specifically, the ECU in this engine control system adjusts opening angle of the EGR valve on the basis of successively inputted various sensor signals indicating the engine operation conditions, with reference, for example, to an adjustment map. Thus, an optimum recirculated uncombusted fuel quantity (map adjustment value) is obtained, which quantity is suitable for the engine operation conditions of the time. An explanation will be given below about a general mode of use of an EGR system.

Such an EGR system is generally used in an engine (internal combustion engine), or a diesel engine, in particular, which is used for motive power for an automobile, for example, so as to improve exhaust characteristics. Diesel engines combusting fuel by self-ignition are generally operated at a lean air-fuel ratio (whose fuel proportion is lower than a theoretical air-fuel ratio) during a steady operation. Therefore, the reaction between oxygen ($O_2$) and nitrogen ($N_2$) is accelerated under high-temperature conditions, tending to produce NOx (nitrogen oxides), or environmental pollutants. Thus, the amount of emission of NOx in generally used diesel engines has been larger than that of spark ignition engines (so-called gasoline engines) which are generally operated at a theoretical air-fuel ratio during steady operation. The EGR system mentioned above is used therefore in such a diesel engine to reduce the amount of emission of NOx. In other words, as mentioned above, by providing such an EGR system in a diesel engine, the exhaust gas flowing through an exhaust passage can be partially recirculated (returned) to an intake passage to mitigate the increase of combustion temperature in the engine. Mitigation in the increase of combustion temperature in an engine suppresses NOx from being produced by the combustion. As disclosed in Japanese Patent Publication (Laid-open) No. 6-108824, for example, such an EGR system is loaded on a number of engine control systems, without being limited to diesel engine control systems, to improve the exhaust characteristics of the engines.

Generally, in engine control systems, including the engine control systems provided with the EGR systems mentioned above, an amount of fuel (which generally corresponds to an injection quantity (injection ratio) of a fuel injection valve as a fuel supply device) supplied for combustion in the engine, or spark timing for the fuel, for example, is controlled so as to match a value suitable (suitable value) for the engine operation conditions (including the opening angle of the EGR valve), with the use of a given map (or an alternative mathematical formula or the like). In this way, torque produced by combustion in the engine, and thus shaft torque (output torque) reflecting loss, for example, is controlled to a desired magnitude. In particular, during steady operation of the engine, such a control mode enables torque control with reliably sufficient accuracy. However, the inventors of the present application have found that such a control mode still has room for improvement, in particular, in the map (or mathematical formula or the like) used in the control.

Recently, combustion is very often carried out at a rich air-fuel is ratio in diesel engines loaded, for example, on automobiles. For example, to cope with the recently tightened emission regulation, combustion at a rich air-fuel ratio (whose fuel proportion is higher than a theoretical air-fuel ratio) is often performed in a temporal manner in the engine for the purpose, for example, of regenerating the exhaust purification catalyst or DPF (diesel particulate filter). In this case in particular, the air-fuel ratio is switched from the lean air-fuel ratio of the steady operation to a rich air-fuel ratio, and then again switched to the lean air-fuel ratio. The inventors have conducted various experiments assuming several cases including the above case. As a result, the inventors confirmed: that, in an engine control system having the EGR system, in particular, a positive (plus) fluctuation is caused in the output torque when the air-fuel ratio is switched (changed) to a leaner air-fuel ratio; and that, further, the drivability of the vehicle is deteriorated when the output torque is shifted from a target value (map adjustment value).

The present invention has been made in light of the circumstances described above, and has as its object to provide an engine torque control apparatus and a method for adjusting the engine torque control apparatus, which are able to maintain high drivability when an air-fuel ratio is changed to a leaner air-fuel ratio in an engine control system having the EGR system.

SUMMARY OF THE INVENTION

Hereinafter are described means for solving the above issue and advantages of the means.

One mode of an engine torque control apparatus of the present invention is applied to an engine control system comprising an engine (internal combustion engine) for rotating an output shaft (e.g., crank shaft) by using torque generated through combustion in cylinders, and EGR means for partially recirculating exhaust gas passing through an exhaust passage of the engine into an intake passage of the engine. The apparatus comprises torque changing means for conducting variable control when an air-fuel ratio indicating a proportion between air and fuel supplied into the cylinders of the engine is changed to a leaner air-fuel ratio, so that torque parameters for increasing/decreasing output torque of the engine can be variably controlled in such a way that torque fluctuation associated with a temporarily changing recirculated uncombusted fuel quantity, which is a quantity of uncombusted fuel recirculated by the EGR means, can be cancelled in a manner suitable for the temporarily changing recirculated uncombusted fuel quantity, at least during a predetermined period immediately after timing for changing the air-fuel ratio.

The inventors pursued the causes of the positive (plus) torque fluctuation (torque increase) mentioned above, which was recognized in changing an air-fuel ratio to a leaner air-fuel ratio in a diesel engine. Then, the inventors have revealed that, immediately after changing an air-fuel ratio of the air (intake air) supplied into the cylinders, from a rich air-fuel ratio where the fuel proportion is high, to a lean air-fuel ratio where the fuel proportion is lower, uncombusted fuel (e.g., chiefly HC (hydrocarbon) in case of hydrocarbon-based fuel) in the exhaust gas turns around (or, is recirculated to) the intake passage through the EGR passage. The inventors have further revealed that the increase of the fuel quantity in the intake air, i.e. torque fluctuation (e.g., torque increase in case of an operation with the lean air-fuel ratio mentioned above), is caused by the turn-around (recirculation) of the uncombusted fuel. The above configuration of the present invention is the result of this pursuance. With this configuration, an offset (torque fluctuation) between an instant torque and a target value (suitable torque) can be successively compensated through a torque variable control conducted by torque changing means. Accordingly, temporarily changing torque (instant torque) can be controlled to appropriate torque. Thus, according to the above mode of the present invention, high drivability can be maintained when changing the air-fuel ratio to a leaner air-fuel ratio in an engine control system having the EGR system.

As a matter of course, in this case, it is possible to configure the apparatus so that the torque variable control can be directly performed on the basis, for example, of the engine operation conditions and demanded torque, without calculating a temporarily changing recirculated uncombusted fuel quantity, which is a quantity of the uncombusted fuel recirculated by the EGR means. However, for performing the torque variable control more accurately, an advantageous configuration may be provided by configuring another mode of the present invention in the mode of the invention described above. That is, another mode of the present invention may be configured by providing recirculation quantity obtaining means for obtaining the temporarily changing recirculated uncombusted fuel quantity, which is a ratio of uncombusted fuel recirculated by the EGR means, and allowing the torque variable means to determine a torque control target value on the basis of the recirculated uncombusted fuel quantity obtained by the recirculation quantity obtaining means. This configuration can allow the torque variable means to readily perform matching between an increase/decrease pattern of the recirculated uncombusted fuel quantity (and thus a torque increase/decrease pattern, which is a pattern associated with the recirculated uncombusted fuel quantity) and an increase/decrease pattern of the instant torque of the engine output, so that the both can be cancelled with each other.

DETAILED DESCRIPTION OF THE PREFERRED EMBODIMENTS

First Embodiment

With reference to FIGS. 1 to 6, hereinafter will be described a first embodiment in which an engine torque control apparatus and a method for adjusting the engine torque control apparatus take shape. Similar to the generally used engine torque control apparatus mentioned above, the engine torque control apparatus according to the present embodiment is also used being incorporated in an engine control system provided with an EGR system to control output torque of the engine. The following description will be given taking as an example a case where this apparatus is incorporated in a system (engine control system) for performing engine control aiming at reciprocating engines (internal combustion engines) used as engines for four-wheeled vehicles.

First, with reference to FIG. 1, a description will now be given on a schematic configuration of an engine control system associated with the first embodiment. The engine used in the present embodiment is a multi-cylinder engine (e.g., four-cylinder engine). However, for the sake of simplicity, only one cylinder is shown in the figure.

Figure 1:
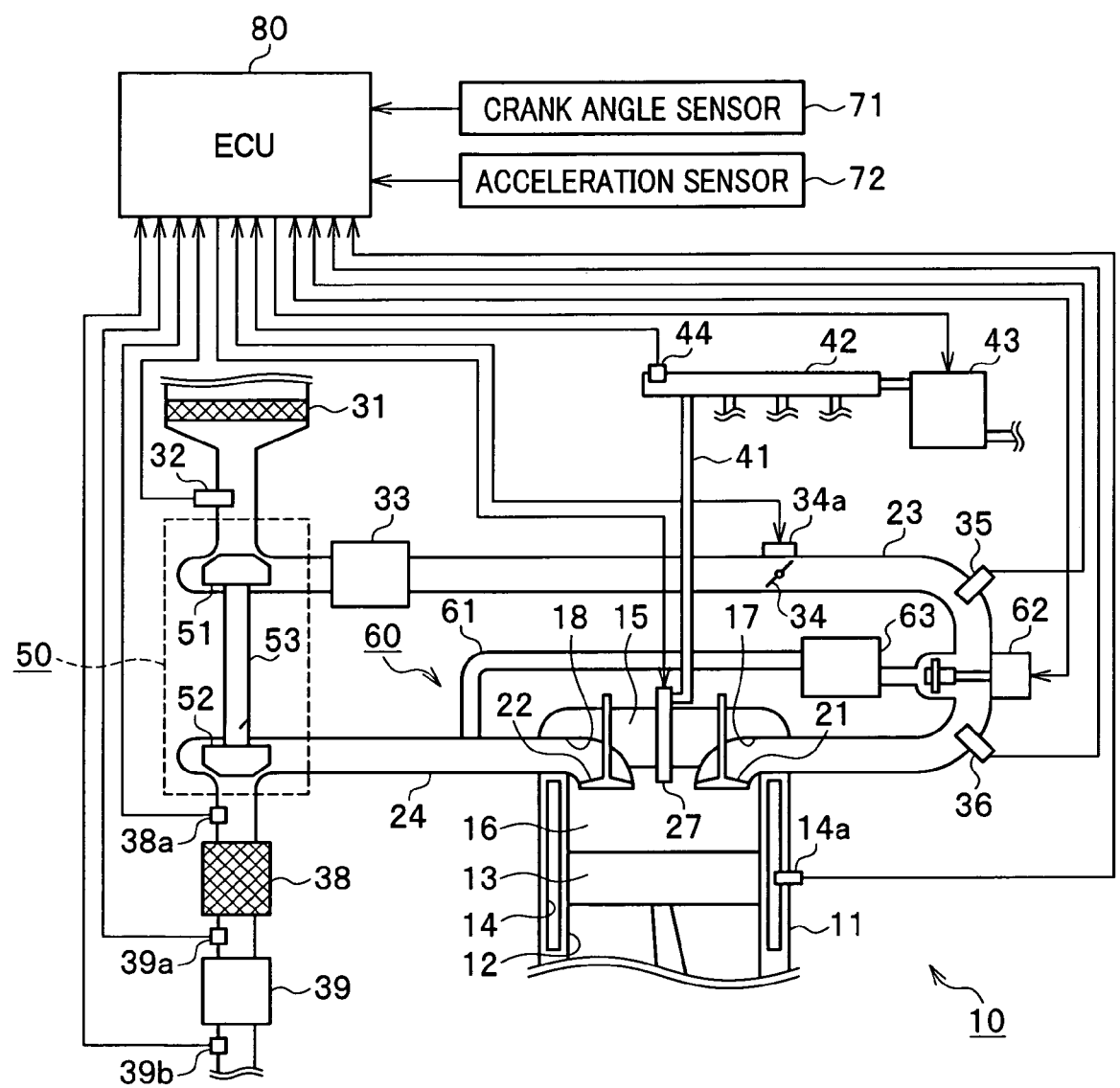
FIG. 1 is a schematic diagram illustrating an engine control system, which is applied with an engine torque control apparatus and a method for adjusting the engine torque control apparatus according to a first embodiment of the present invention.

As shown in FIG. 1, this engine control system aims to control a reciprocating diesel engine 10 having a common-rail type fuel injector, and is structured being provided, for example, with various sensors and an ECU (electronic control unit) 80 for controlling the engine 10.

The engine 10 to be controlled has a basic structure in which a cylinder 12 (only one is shown for simplification) is formed in a cylinder block 1, and a piston 13 is accommodated in the cylinder 12. A crank shaft as an output shaft, not shown, is adapted to rotate with the reciprocal movement of the piston 13.

The cylinder block 11 is provided with a cooling water passage 14 and a cooling water temperature sensor 14a for detecting the temperature of the cooling water flowing through the passage 14. The engine 10 is cooled by the cooling water. A cylinder head 15 is fixed to the upper end surface of the cylinder block 11, with a combustion chamber 16 being provided between the cylinder head 15 and the top surface of the piston 13.

An intake port 17 and an exhaust port 18 both opening into the combustion chamber 16 are formed at the cylinder head 15. The intake port 17 and the exhaust port 18 are adapted to be opened/closed by an intake valve 21 and an exhaust valve 22, respectively, which are driven by cams, not shown, attached to a cam shaft that interlocks with the crank shaft. In order to have the combustion chamber 16 in the cylinder 12 communicated with the air outside the vehicle, the intake port 17 is connected to an intake tube (intake manifold) 23 for taking in the outside fresh air (new air), and the exhaust port 18 is connected to an exhaust tube (exhaust manifold) 24 for exhausting the combustion gas (exhaust gas).

New air (fresh air) is taken into the intake tube 23 constituting an intake system of the engine 10 after being removed with foreign matter therefrom through an air cleaner 31 disposed at the upmost stream portion of the intake tube 23. An airflow meter 32 (e.g., hot-wire type airflow meter) is disposed downstream of the air cleaner 31 to detect the amount of the new air (new air amount) as an electrical signal. An intercooler 33 for cooling the intake air is disposed downstream of the airflow meter 32. Further downstream of the intercooler 33, there are disposed an electronically-controlled throttle valve 34 whose opening angle is electronically adjusted by an actuator, such as a DC motor, and a throttle opening angle sensor 34a for detecting the opening angle or movement (opening angle change) of the throttle valve 34.

On the other hand, the exhaust tube 24 constituting an exhaust system of the engine 10 is provided with a post-exhaustion processing system for carrying out cleanup of the exhaust gas. The post-exhaustion processing system includes a DPF (diesel particulate filter) 38 for collecting PM (particulate matter) in the exhaust gas and an NOx occlusion-reduction type catalyst 39 (hereinafter referred to as an "NOx catalyst 39") for cleaning up NOx (nitrogen oxides) from the exhaust gas. In the present embodiment the DPF 38 is arranged upstream of the exhaust tube 24 and the NOx catalyst 39 is arranged downstream of the exhaust tube 24.

The DPF 38 is a continuous-regeneration type fitter for collecting PM in the exhaust gas. For example, the DPF 38 may be intermittently used by repeatedly combusting/removing (corresponding to regeneration process) the collected PM by post combustion, for example, following the main fuel combustion for generating torque. The DPF 38 supports an oxidation catalyst, not shown, of platinum system and is adapted to remove HC or CO together with a soluble organic fraction (SOF), one of the PM fractions.

The NOx catalyst 39 is made, for example, of an alkaline-earth based material (occlusive material) and platinum. The NOx catalyst 39 is characterized in that it occludes NOx in the exhaust gas when the atmosphere of the exhaust gas has a lean air-fuel ratio (whose fuel proportion is lower than a theoretical air-fuel ratio), and allows reduction components, such as HC or CO, in the exhaust gas to reduce/remove the occluded NOx when the atmosphere of the exhaust gas has a rich air-fuel ratio (whose fuel proportion is higher than a theoretical air-fuel ratio). Repetition of occlusion/reduction (emission) of NOx with this NOx catalyst 89 will be led to cleanup of the NOx in the exhaust gas to thereby realize reduction of NOx emission. In the present embodiment, the air-fuel ratio in the NOx catalyst 39 is temporarily made rich by periodically supplying excessive fuel (so-called rich purge), to reduce/remove the NOx occluded by the NOx catalyst 39. Thus, the cleanup performance (exhaust cleanup performance) of the catalyst 39 is periodically regenerated, so that the catalyst 39 can be continuously used.

In the exhaust tube 24, an exhaust gas temperature sensor 38a for detecting exhaust gas temperature is arranged upstream (or downstream) of the DPF 38. Further, A/F sensors 39a and 39b are arranged upstream and downstream, respectively, of the NOx catalyst 39. The A/F sensors 39a and 39b serve as oxygen concentration sensors for outputting oxygen concentration detection signals corresponding to the oxygen concentration in the exhaust gas. Calculation on the air-fuel ratio is successively performed on the basis of the oxygen concentration detection signals. The oxygen concentration detection signals as sensor outputs of the A/F sensors 39a and 39b are adjusted so as to linearly change in response to the oxygen concentration. These exhaust gas temperature sensor 38a as well as the A/F sensors 39a and 39b play particularly important roles in the regeneration processes of the DPF 38 and the NOx catalyst 39, and are chiefly used for detecting, for example, starting/ending timing of the regeneration processes.

An injector 27 as an electromagnetically-driven (or piezo-driven) fuel injection valve is also provided in the combustion chamber 16 in the cylinder 12 so as to inject/supply fuel (light oil) for contributing to the combustion in the combustion chamber 16. For simplification, the injector 27 arranged in only one cylinder (cylinder 12) is shown, however, in practice, such injectors are provided in the individual cylinders in the engine 10. The individual injectors of the engine 10 are connected to a common rail 42 as accumulator piping through high-pressure fuel piping 41. The common rail 42 is successively supplied with high-pressure fuel from a fuel pump 43 and stores therein the fuel having high pressure corresponding to the injection pressure. A fuel pressure sensor 44 is provided at the common rail 42 to detect the fuel pressure (common rail pressure) in the common rail 42. Thus, it is so arranged that the original pressure of the fuel to injected and supplied by the injectors can be continually monitored.

In the engine 10, required amount of fuel is continually injected and supplied to the individual cylinders through the valve-opening driving for the injectors. In other words, during the operation of the engine 10, an opening movement of the intake valve 21 can introduce the intake air from the intake tube 23 into the combustion chamber 16 in the cylinder 12, for mixture with the fuel injected/supplied by the injector 27. Then, the mixture, i.e. the air-fuel mixture, is compressed by the piston 13 in the cylinder 12, followed by ignition (self-ignition) and combustion, so that an opening movement of the exhaust valve 22 can discharge the post-combustion exhaust gas to the exhaust tube 24. It should be noted that the engine 10 is a four-stroke engine. Specifically, one combustion cycle consisting of intake, compression, combustion and discharge is successively performed at "720° CA (crank angle)" period.

This system is further provided with a turbocharger 50 between the intake and exhaust tubes 23 and 24. The turbocharger 50 has an intake compressor 51 disposed midway of the intake tube 23 (between the airflow meter 32 and the intercooler 33) and an exhaust turbine 52 disposed midway of the exhaust tube 24 (upstream of the exhaust gas temperature sensor 38a). The compressor 51 and the turbine 52 are linked through a shaft 53. Specifically, the exhaust turbine 52 is rotated by the exhaust gas flowing through the exhaust tube 24, and the turning force is transmitted to the intake compressor 51 through the shaft 53. Then, the air flowing through the intake tube 23 is compressed by the intake compressor 51 for pressure-charging. The pressure-charging can help enhance the charging efficiency for the cylinders. The pressure-charged air is cooled by the intercooler 33 to further enhance the charging efficiency for the cylinders.

An EGR (exhaust gas recirculation) system 60 is also arranged between the intake tube 23 and the exhaust tube 24 to partially recirculate (return) EGR gas to the intake system. The EGR system 60 basically includes: EGR piping 61 for permitting the intake tube 23 to communicate with the exhaust tube 24 in the vicinity of the intake/exhaust ports 17 and 18; an EGR valve 62 disposed downstream of the throttle valve 34 of the intake tube 23 and made up, for example, of an electromagnetic valve capable of adjusting a passage area of the EGR piping 61 and thus an EGR amount (recirculation amount) with its valve opening angle; and an EGR cooler 63 for cooling the EGR gas passing through the EGR piping 61. In the vicinity of the linking portion between the intake tube 23 and the EGR tube 61, or upstream and downstream of the linking portion, there are provided, respectively, an intake air temperature sensor 3S for detecting the intake air temperature and outputting the detected temperature as an electrical signal, and an intake air pressure sensor 36 for detecting the intake air pressure and outputting the detected pressure as an electrical signal. The EGR system 60 having such a configuration partially recirculates the exhaust gas to the intake system through the EGR piping 61 to reduce combustion temperature and thus to reduce generation of NOx. In the state where the EGR valve 62 is fully open, the EGR piping 61 is blocked off to have the EGR amount to be "zeroed".

The vehicle, not shown, is further equipped with various sensors for vehicle control, other than the sensors mentioned above. For example, a crank angle sensor 71 is provided at an outer peripheral side of the crank shaft serving as the output shaft of the engine 10. The crank angle sensor outputs a crank angle signal at every predetermined crank angle (e.g., at 30° CA period) to enable detection, for example, of the position of the crank shaft (rotation angle position) and the rotating speed of the crank shaft (engine speed). Also, an acceleration sensor 72, for example, is provided at an accelerator pedal which is pressed down by the driver for operation. The acceleration sensor 72 detects a manipulated variable (accelerator opening angle) of the accelerator pedal, converts the detected amount into an electrical signal, and outputs the electrical signal.

An ECU 80, which is the engine torque control apparatus of the present embodiment, positively performs engine control in this system, as an electronic control unit. The ECU 80 includes a known microcomputer (not shown) and grasps the operation conditions of the engine 10 or the user's (driver's) demands on the basis of the detection signals derived from the various sensors mentioned above. In response to the operation conditions or the user's demands, the ECU 80 operates various actuators, such as the injector 27, so that various controls can be conducted for the engine 10 in the best mode suitable for the circumstances. The microcomputer provided in the ECU 80 basically includes various arithmetic units, memory units, signal processing units and communication units, including a CPU (central processing unit) for carrying out various calculations, a RAM (random access memory) as a main memory for temporarily storing the data being calculated, the results of the calculations, and the like, a ROM (read-only memory) as a program memory, an EEPROM (electrically erasable programmable read-only memory) as a memory for storing data, a backup RAM (RAM which is supplied power by a backup power source, such as an on-vehicle battery), a signal processing unit, such as an A/D converter or a clock generator, and an I/O port for inputting/outputting signals from/to an external unit. The ROM stores, for example, programs associated with the torque control and various programs and control maps associated with the engine control, in a default manner. The data storage memory (e.g., EEPROM) stores, for example, design data of the engine 10 and various control data, in a default manner.

In the present embodiment, the ECU 80 is adapted to calculate a controlled variable of the engine on the basis of the successively inputted variable sensor outputs (detection signals) and to control the engine torque (output torque) generated through the combustion in the engine 10 on the basis of the controlled variable of the engine. Specifically, the ECU 80 calculates an injection quantity (controlled variable of the engine) suitable for the driver's manipulated variable of the accelerator pedal, at the injection timing, for example, suitable for the engine operation conditions of the time. Then, the ECU 80 outputs an injection control signal to the injector 27 to instruct fuel injection based on the injection quantity. In this way, the output torque of the engine 10 is controlled to a target value on the basis of a driving variable (e.g., valve opening period) of the injector 27. As described above, a diesel engine performs combustion by self-ignition and thus the intake air throttle valve (throttle valve 34) provided at the intake passage of the engine 10 is usually kept at a certain opening angle (e.g., fully opened state). Accordingly, combustion control of the engine 10 is dominantly performed for the injection quantity.

Figure 2:
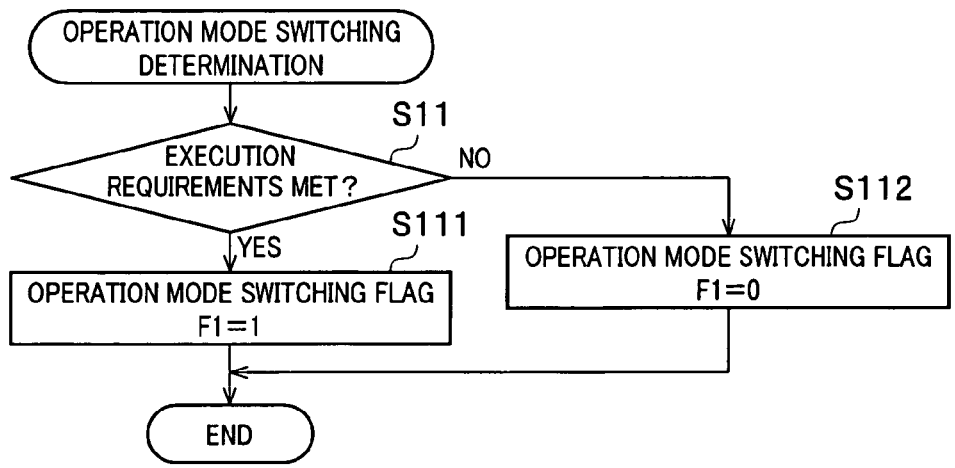
FIG. 2 is a flow diagram illustrating a process procedure for determining satisfactoriness of execution requirements for torque control according to the first embodiment.
Figure 3:
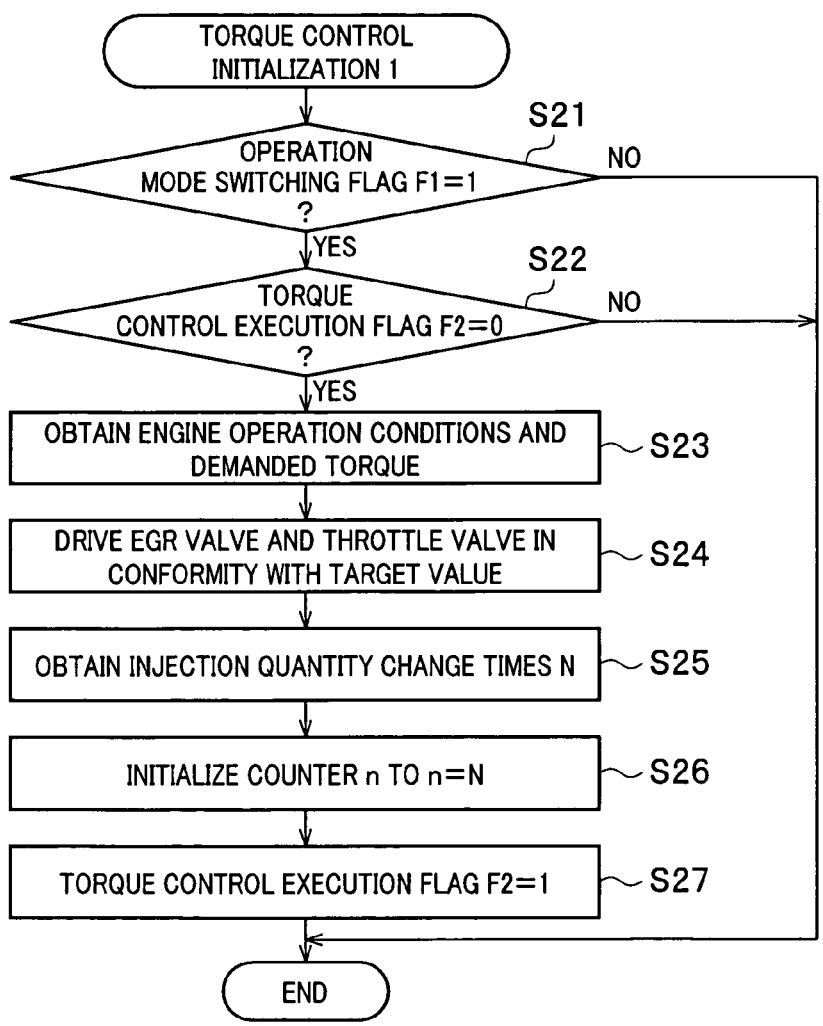
FIG. 3 is a flow diagram illustrating a process procedure for initializing the torque control according to the first embodiment.
Figure 4:
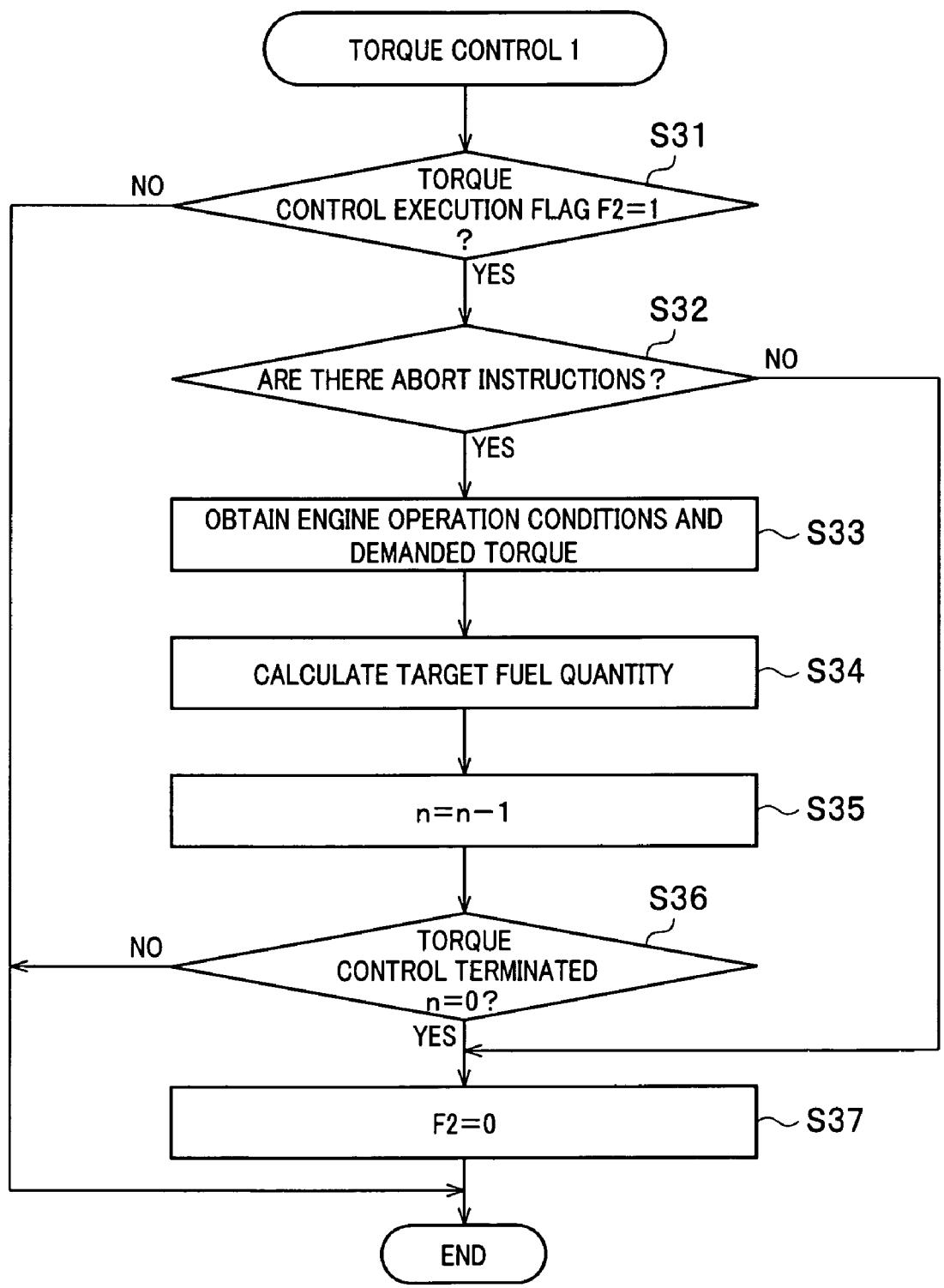
FIG. 4 is a flow diagram illustrating the contents of the torque control according to the first embodiment.

Referring now to FIGS. 2 to 4, hereinafter is described the torque control performed by the engine torque control apparatus (ECU 80) according to the present embodiment. These figures are flow diagrams each illustrating a process procedure of the torque control. Basically, these series of processes are successively executed at every predetermined crank angle or at every predetermined temporal cycle (e.g., every combustion cycle) by having the programs stored in the ROM of the ECU 80 executed. Various parameters used in the processes shown in these figures are continually stored in the memory units, such as RAM and EEPROM, loaded on the ECU 80 and continually renewed as required.

In performing the torque control, satisfactoriness of execution requirements for the torque control is determined in the process shown in FIG. 2. Only when the execution requirements are met, initialization of the torque control (torque control initialization 1) and the contents of the control (torque control 1) are executed as a series of processes shown in FIGS. 3 and 4, respectively. To begin with, referring to FIG. 2, satisfactoriness of execution requirements for the torque control is described.

As shown in FIG. 2, in determining the satisfactoriness of execution requirements, it is determined, at step S11, first, whether or not switching of operation modes (which are registered in advance) has been performed, the switching entailing switching from a predetermined rich air-fuel ratio (richer than a theoretical air-fuel ratio) to a predetermined lean air-fuel ratio (leaner than a theoretical air-fuel ratio), which is performed in a binary manner. Particularly, for example, it is determined whether or not the regeneration process (rich purge) of the NOx catalyst 39 has been executed and completed. In other words, the air-fuel ratio that has been controlled to a maximally lean level (by fully opening the throttle valve 34) during the steady operation is temporarily controlled to a predetermined level of rich air-fuel ratio when the regeneration process is executed by the NOx catalyst 39.

When the regeneration process is completed, the air-fuel ratio is again controlled to the maximally lean level (predetermined lean air-fuel ratio). At the time of completing the regeneration process, a determination is made, at step S11, that the regeneration process has been completed. However, after the lapse of a predetermined period from the completion of the regeneration process, it is determined again at this step S11 that the regeneration process has not been completed.

When the operation modes are determined, at step S11, as having been switched, that is, when the regeneration process of the NOx catalyst 39 is determined as having been completed, the execution requirements are regarded to have been met. Subsequently, at step S111, "1" is set at an operation mode switch flag F1 (operation mode switch flag F1=1) to end the series of processes of the flow diagram shown in FIG. 2. On the other hand, when the operation modes are determined, at step S11, as not having been switched, the execution requirements are regarded not to have been met. Then, the control proceeds to step S112 where "0" is set at the operation mode switch flag F1 (operation mode switch flag F1=0) to end the series of processes of the flow diagram shown FIG. 2.

In the processes (torque control initialization 1) of FIG. 1, it is determined, at an initial step S21, whether or not the execution requirements have been met, that is, whether or not "1" has been set at the operation mode switch flag F1. Step S21 is repeated until the execution requirements are met. When "1" is set at the operation mode switch flag F1 through the series of processes of FIG. 2, a determination is made, at step S21, that "1" has been set at the flag F1 and then control proceeds to step S22.

At step S22, it is determined whether or not "0" has been set at a torque control execution flag for F2 indicating completion/incompletion of the initialization. When it is determined that "0" has been set at the flag F2, the initialization is regarded as not having been completed, and control proceeds to step S23.

At step S23, engine operation conditions (e.g., engine speed) of the time and demanded torque (magnitude of engine torque, output of which is demanded then by the driver or other systems) are acquired. It should be appreciated that the engine speed is detected on the basis of the output, for example, from the crank angle sensor 71. The demanded torque is calculated on the basis of the manipulated variable of the accelerated pedal, for example, detected by the acceleration sensor 72.

At the subsequent step S24, target values of the opening angles of the throttle valve 34 and the EGR valve 62 are set on the basis of the acquired engine speed and demanded torque, followed by driving the throttle valve 34 and the EGR valve 62 so as to be in conformity with the target values (target opening angles). It should be appreciated that the target values of the opening angles are obtained using, for example, a given map in which suitable values are written by conducting in advance experiments or the like (or by using a given mathematical formula). A map (stored in ROM, for example) used in the steady operation can be utilized as this given map.

At the subsequent step S25, the number of times N of gradual change of the injection quantity (hereinafter referred to as a "injection quantity change times N"), which number corresponds to a process period of the torque variable control (fuel amount reducing control), is calculated based on the engine speed and the demanded torque obtained at step S23. This injection quantity change times N is also obtained using, for example, a given map (stored in the ROM, for example) in which suitable values are written by conducting in advance experiments or the like (or by using a given mathematical formula).

At the subsequent step S26, injection quantity change times N obtained at step S25 is set at a counter n. Setting at the counter n is regarded as the completion of the initialization for the torque control, and control proceeds to step S27. At step S27, "1" is set at the torque control execution flag F2, by which a determination will come to be made, at step S22 described above, that "1" is set at the flag F2. Then, the initialization processes of step S23 onwards of FIG. 3 will no longer be performed.

In the process (torque control 1) of FIG. 4, it is determined, at an initial step S31, whether or not "1" has been set at the torque control execution flag F2. Step S31 is repeated until "1" is set at the flag F2. When "1" is set at the torque control execution flag F2 through the process at step S27 of FIG. 3, it is determined, at step S31, that "1" has been set at the flag F2 and then control proceeds to step S32.

At step S32, it is determined whether or not abort instructions for prompting abort of the torque control have been issued. When the abort instructions have been determined, at step S32, as not having been issued, control proceeds to step S33. The abort instructions are issued as an interruption process only when, for example, predetermined failsafe requirements (e.g., requirements indicating unconformity between the operation command and the engine conditions) are met.

At step S33, engine operation conditions (e.g., engine speed) and demanded torque are obtained. At the subsequent step S34, a command value of an injection quantity to be injected and supplied to the injector 27 per one combustion cycle (720° CA) (target injection quantity) is calculated on the basis of the obtained engine speed and the demanded torque. Specifically, the target injection quantity is calculated using, for example, a given map (stored in ROM, for example) in which suitable values are written for every engine speed and every demanded torque by conducting in advance experiments or the like (or by using a given mathematical formula). In this way, in case, for example, of a single-stage injection, calculation is made for the injection quantity, or in case of a multi-stage injection, calculation is made for a total injection quantity of the injections associated with torque generation. The command value (driving time period) for the injector 27 is set on the basis of the calculated injection quantity.

At the subsequent step S35, the counter n is decremented (n=n−1). Then, at step S36, a determination is made whether or not the counter n has turned to "0" (n=0), or whether or not torque control has been terminated. While the "n=0" is not established at step S36, the torque control of the contents of steps S33 and S34 is repeatedly executed.

When the counter n is determined as having turned to "0" (n=0) at step S36, "0" is set at the torque control execution flag F2 at the subsequent step S37. Thus, at the previous step S31, a determination comes to be made that "1" is not set at the flag F2, and thus the processes of step S32 onwards will no longer be performed. Where the abort instructions are determined as having been issued at the previous step S32, "0" is set at the torque control execution flag F2 at the subsequent step S37 even when the torque control is underway, and the processes of step S32 onwards will not be performed. When the processes are aborted, it is preferred to perform a predetermined process for failing (to take measure for failing) as required, such as lighting of a warning lamp.

Figure 5:
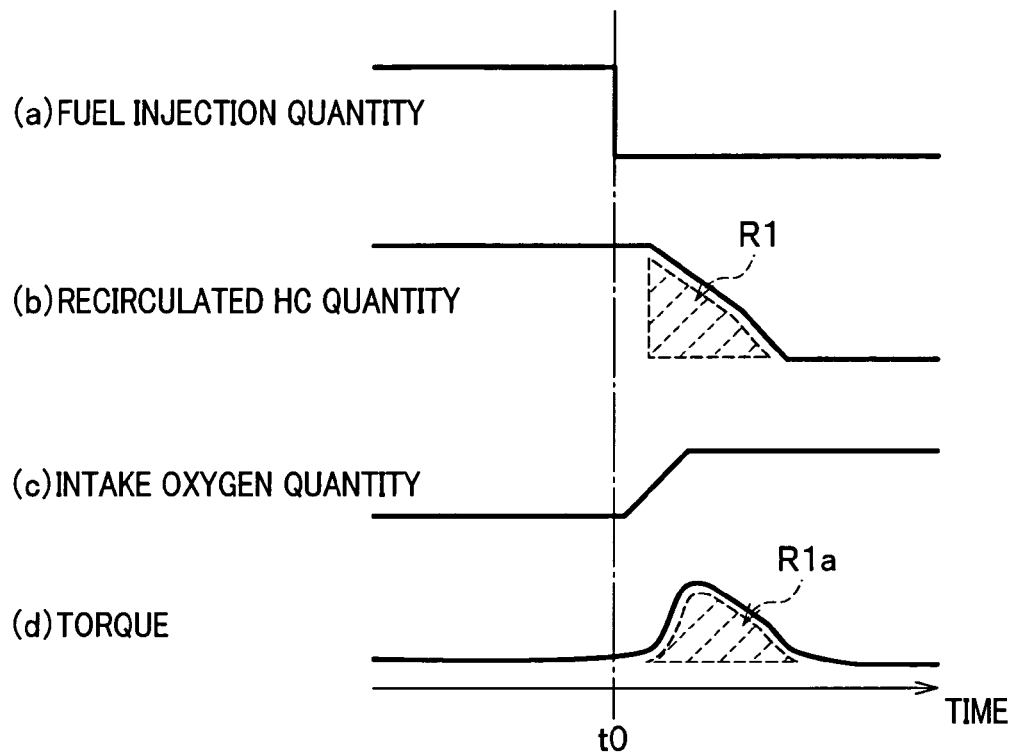
FIG. 5 shows timing diagrams, each illustrating an operation mode of a comparative example.
Figure 6:
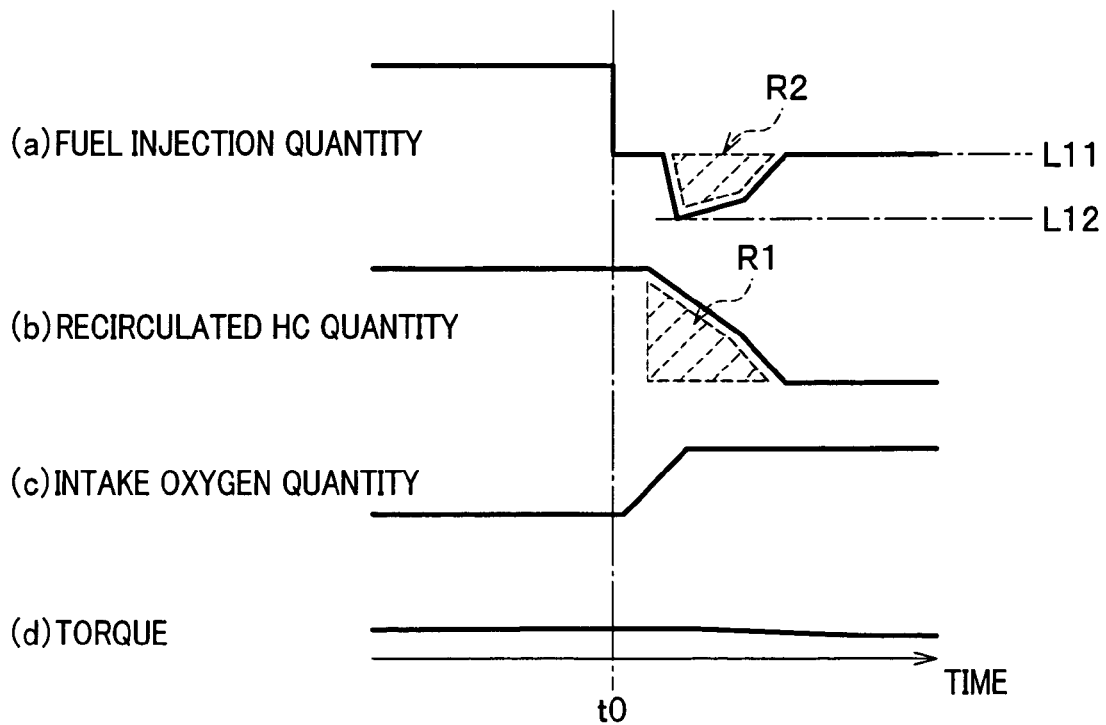
FIG. 6 shows timing diagrams, each illustrating an operation mode of an apparatus according to the first embodiment.

Referring to FIGS. 5 and 6, an operation mode of the engine torque control unit (ECU 80) according to the present embodiment will be described. As a comparative example, an apparatus is employed here, which does not perform the processes (torque control) shown in FIGS. 3 and 4. FIG. 5 shows an operation mode of this comparative example. FIG. 6 shows an operation mode of the present embodiment. The description below is made by comparing between the both. FIGS. 5(a) and 6(a) are timing diagrams each showing an injection quantity per combustion cycle. FIGS. 5(b) and 6(b) are timing diagrams each showing an amount of recirculated HC (hydrocarbon) (uncombusted fuel) in the exhaust gas recirculated to the intake tube 23 (intake passage) by the EGR system 60. FIGS. 5(c) and 6(c) are timing diagrams each showing an amount of oxygen (intake oxygen amount) in intake air correlated to an intake air amount. FIGS. 5(d) and 6(d) are timing diagrams each showing transition of torque (output torque) outputted to the crank shaft serving as an output shaft of the engine 10.

As shown in FIGS. 5 and 6, in these examples, the regeneration process (rich purge) of the NOx catalyst 39 is performed up to timing t0 and the process is completed at the timing t0. Specifically, operation mode is switched from the rich air-fuel ratio to the lean air-fuel ratio at the timing t0 in a binary manner. Meanwhile, it is determined at step S11 of FIG. 2 that the operation mode has been switched. In particular, in performing this operation mode switching (timing t0), the injection quantity is decreased (the driving time period of the injector 27 is shortened (see FIGS. 5(a) and 6(a)), and at the same time, an amount of new air (amount of supplied oxygen) is increased (the opening angle of the throttle valve 34 is made large (see FIGS. 5(c) and 6(c)). In the comparative example, immediately after the operation mode is switched, the uncombusted fuel (HC) in the exhaust gas turns around toward the intake tube 23 (region R1 in FIG. 5(b)) through the EGR piping 61 to raise the amount of fuel in the intake air, and thus to permit torque to be enhanced (region R1a in FIG. 5(d)).

As indicated by a region R2 in FIG. 6(b), in the apparatus of the present embodiment as well, immediately after the operation mode is switched, the uncombusted fuel (HC) turns around toward the intake tube 23 as in the case of the comparative example. However, the output torque of the engine 10 is variably controlled in the present embodiment, so that torque fluctuation caused by HC recirculated by the EGR system 60 can be cancelled in a manner suitable for a temporarily changing HC quantity of the time. For example, in preparing the map used in step S34 of FIG. 4, a turn-around pattern (transition of the recirculated HC quantity) of the uncombusted fuel (HC) immediately after the operation mode switching may be obtained through experiments, for example, covering every engine operation condition (e.g., engine speed) or every demanded torque, in order to determine (write in) an injection quantity pattern (temporarily changing injection quantity) for cancelling the torque increase at every fluctuation of the recirculated HC quantity. Thus, the torque increase can be cancelled in conformity with the transition of the recirculated HC quantity. Then, at the same step S34, the injection quantity can be variably controlled on the basis of thus prepared map. Specifically, as shown in FIG. 6(a), the injection quantity that has been increased for the rich purge may be restored to an injection quantity L11 for the steady operation when the operation mode is switched (timing t0), immediately followed by decreasing the injection quantity to a level of an injection quantity L12. Then, the injection quantity may be adapted to be gradually restored to the injection quantity L11, spending the time (clocked at step S35 of FIG. 4) correlated to the injection quantity change times N (gradual change time) set at step S26 of FIG. 3. In this way, as shown in FIG. 6(d), the torque decrease resulting from the control at step S34 of FIG. 4 comes to be cancelled by the torque increase mentioned above (the region R1a of FIG. 5(d)). Thus, the torque fluctuation (torque shock) at the time of switching the operation mode comes to be suppressed.

As described above, the engine torque control apparatus and method for adjusting the engine torque control apparatus according to the present embodiment can guarantee beneficial advantages as provided below.

(1) The engine torque control apparatus (engine control ECU 80) is applied to an engine control system which includes: the engine 10 (internal combustion engine) for rotating the output shaft (crank shaft) by the torque generated by the combustion in the cylinder 12; and the EGR system 60 (EGR means) for partially recirculating the exhaust gas flowing through the exhaust tube 24 (exhaust passage) of the engine 10 to the intake tube 23 (intake passage). This apparatus is configured by providing a program (torque changing means, see steps S33 to S36 of FIG. 4) for selectively and limitedly effecting variable control of the injection quantity (torque parameter) of the injector 27, so that, when the air-fuel ratio indicating a proportion between the air and fuel supplied to the cylinder 12 in the engine 10 is changed to a leaner air-fuel ratio, torque fluctuation caused by the recirculated HC is cancelled according to the temporally changing amount of HC (amount or recirculated uncombusted fuel) recirculated by the EGR system 60, during a predetermined period immediately after the air-fuel ratio change timing t0 (see FIG. 6). Such a configuration may enable successive correction of the offset (torque fluctuation) between an instant torque and a torque having a target value (suitable torque), through the processes of the steps S33 to S36 of FIG. 4. Thus, this configuration can control a temporally changing torque (instant torque) to an appropriate torque. In other words, when the air-fuel ratio is changed to a leaner air-fuel ratio in the engine control system having the EGR system 60, high operation properties (drivability) can be maintained.

(2) The engine torque control apparatus is configured by providing a program for detecting the air-fuel ratio change timing t0 upon termination (completion) of a registered operation mode (rich purge) (step S11 of FIG. 2). Thus, it is possible detect the air-fuel ratio change timing t0 in a more accurate manner.

(3) The engine torque control apparatus is so configured that the variable control of toque (steps S33 to S36 of FIG. 4) is performed when the air-fuel ratio of the engine 10 is switched, in a binary manner, from a rich air-fuel ratio (for rich purge) that is a predetermined air-fuel ratio richer than a theoretical air-fuel ratio, to a lean air-fuel ratio (for steady operation) that is a predetermined air-fuel ratio leaner than a theoretical air-fuel ratio. Thus, it is possible to suppress torque fluctuation (torque increase in case of the present embodiment) in an accurate manner, which fluctuation tends to occur at the time of performing switching from the rich air-fuel ratio to the lean air-fuel ratio.

(4) The engine torque control apparatus is so configured that, at steps S33 to S36 of FIG. 4, the variable control of torque shown in the figure, which is generated through the combustion in the engine 10, is performed by decreasing the amount of fuel (injection quantity) supplied for the combustion. Thus, the torque control can be readily performed in an accurate manner.

(5) The engine torque control apparatus is so configured that, at steps S33 to S36 of FIG. 4, the injection quantity is once controlled, immediately after the air-fuel ratio change timing t0, to a level (the injection quantity L12 smaller than the injection quantity L11) for decreasing torque, which level is lower than the level (the injection quantity L11) of injection quantity for the steady operation of the engine, and that, then, the injection quantity is changed to the level (the injection quantity L11) for the steady operation, spending a predetermined time period (correlated to the injection quantity change times N). Thus, torque fluctuation (torque increase) caused with the change of the recirculated HC quantity can be cancelled in a more accurate manner.

(6) The engine torque control apparatus is so configured that, with the aid of a given map, the injection quantity can be controlled at every fluctuation of the recirculated HC quantity, so that the torque increase can be cancelled in conformity with the transition of the recirculated HC quantity immediately after the operation mode switching (air-fuel ratio change). Thus, torque fluctuation (torque increase) caused with the change of the recirculated HC quantity can be cancelled in a more accurate manner.

(7) The engine torque control apparatus is so configured that the transition of the recirculated HC quantity (the turn-around pattern of HC) is calculated by the EGR system 60 for the predetermined time period (correlated to the injection quantity change times N) immediately after the timing when the air-fuel ratio is changed to the leaner air-fuel ratio, by operating the engine control system in which the apparatus is applied, and that the transition of the recirculated HC quantity is set at the engine torque control unit (ECU 80) of the present embodiment (particularly, the transition is readably stored in the ROM in the form of a map). Thus, the increase/decrease pattern of the recirculated HC quantity (and thus the torque increase/decrease pattern corresponding to the change of the recirculated HC quantity) can be matched with the increase/decrease pattern of the instant torque reflecting the engine output, so that the both can be readily cancelled with each other.

Second Embodiment

Hereinafter will be described a second embodiment to which the engine torque control apparatus of the present invention is applied. In the present embodiment, the identical or similar components to those in the first embodiment are given the same reference numerals for the sake of omitting explanation. Similar to the apparatus of the first embodiment, the apparatus of the present embodiment is also basically applied to an engine control system as shown in FIG. 1. In the apparatus of the present embodiment, however, the configurations of the programs provided in the ECU 80 are partially different. In the present embodiment, the description will be focused on the differences from the apparatus of the first embodiment.

Referring to FIGS. 7 to 10, hereinafter is described the torque control associated with the present embodiment.

Figure 7:
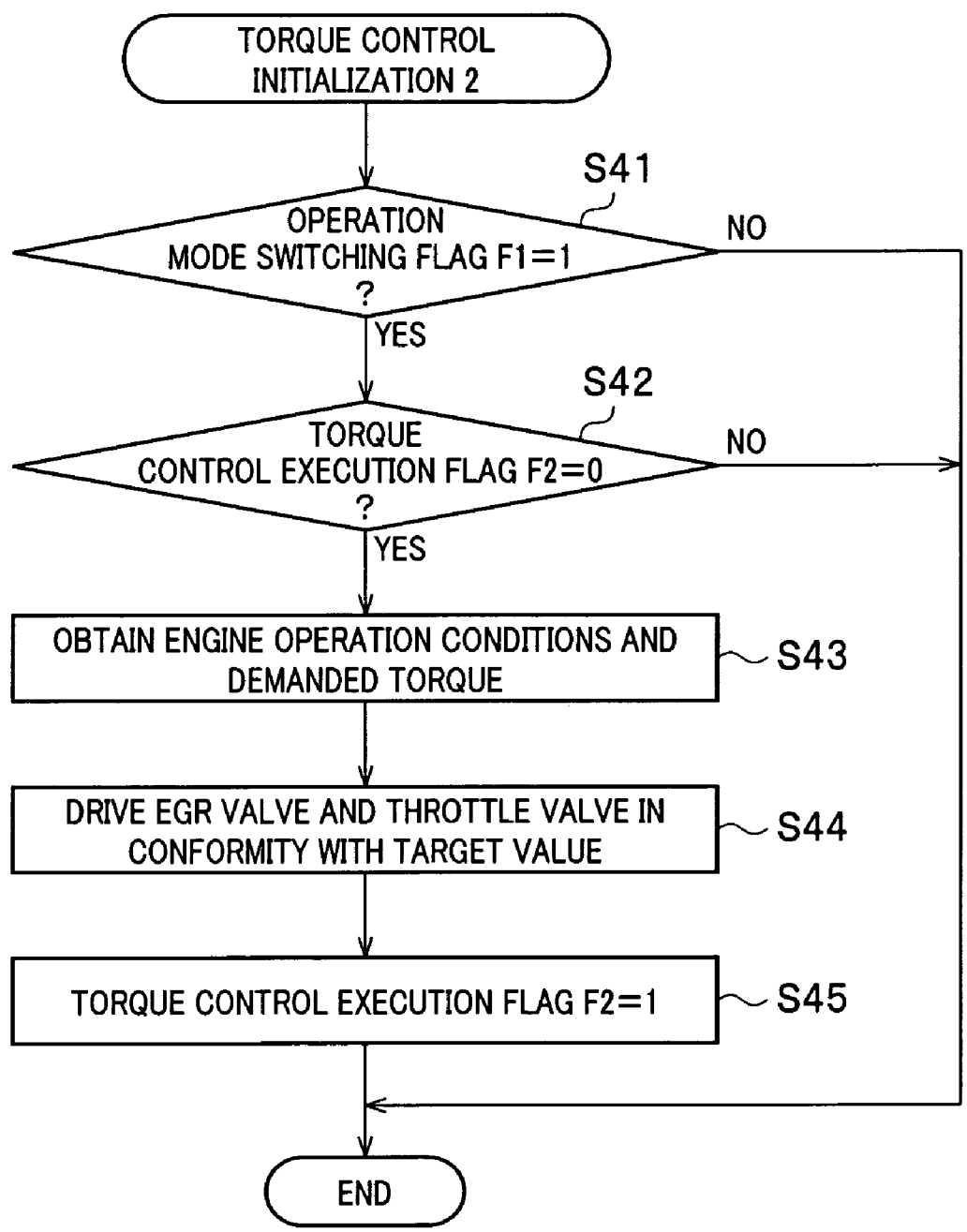
FIG. 7 is a flow diagram illustrating a process procedure for initializing torque control performed by an engine torque control apparatus according to a second embodiment of the present invention.
Figure 8:
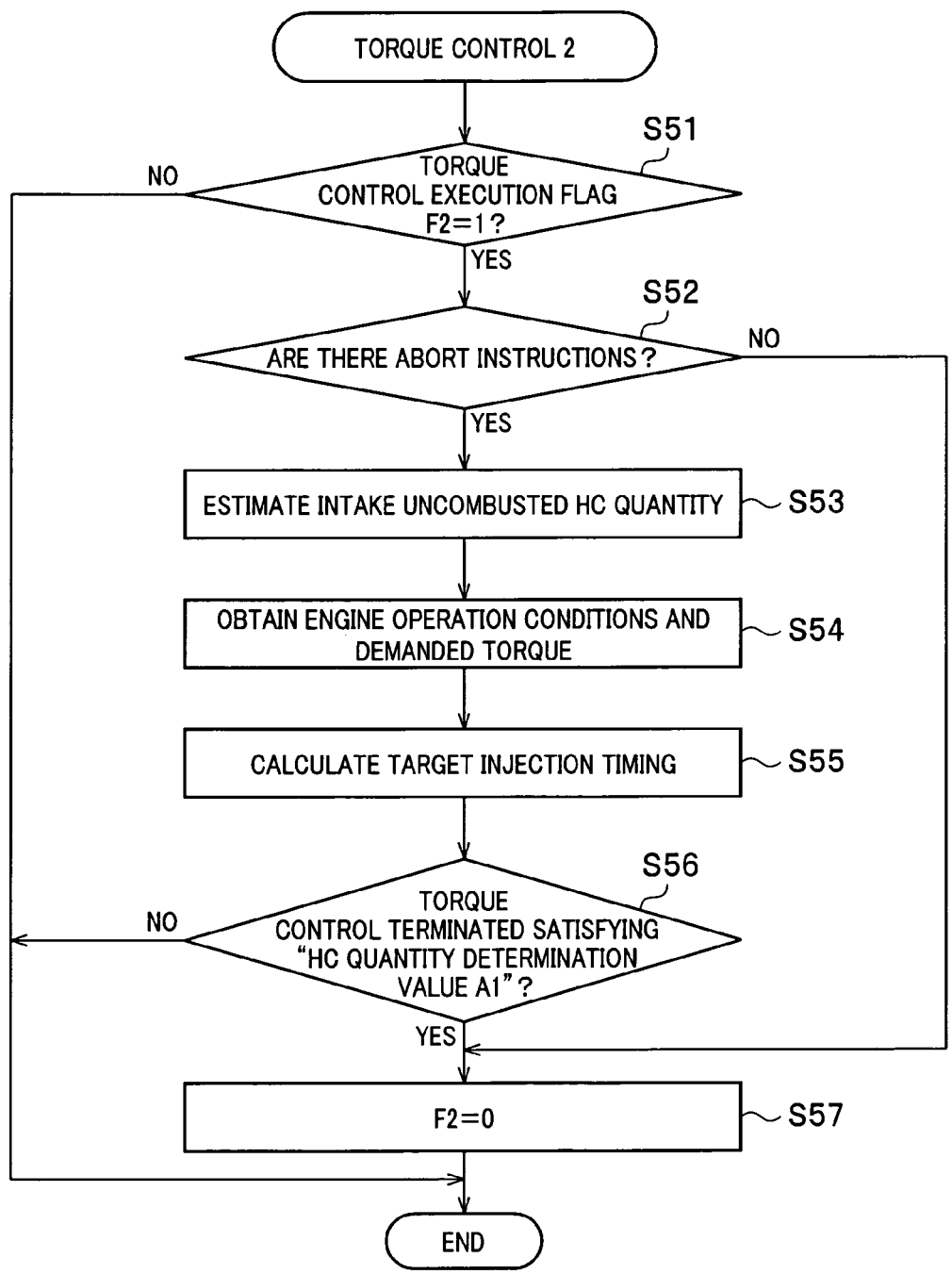
FIG. 8 is a flow diagram illustrating the contents of the torque control according to the second embodiment.

FIGS. 7 and 8 are flow diagrams illustrating the process procedures of the torque control. In the torque control of the present embodiment, satisfactoriness of the execution requirements for the torque control is also determined through the processes of FIG. 2. Only when the execution requirements are determined as being met through the processes of FIG. 2, initialization (torque control initialization 2) of the torque control and contents of the control (torque control 2) are executed as a series of processes shown in FIGS. 7 and 8. Basically, the series of processes of FIGS. 7 and 8 are also successively executed at every predetermined crank angle or at every predetermined temporal cycle (e.g., every combustion cycle) by having the programs stored in the ROM of the ECU 80 executed. The parameters used in the processes of each of the figures are also continually stored the memory units, such as the RAM and the EEPROM, provided in the ECU 80 and renewed as required. As to the processes of FIG. 2 described above, the description is omitted here. Hereinafter, those points different from the first embodiment are chiefly described in detail for the processes of FIGS. 7 and 8.

As shown in the processes of FIG. 7 (torque control initialization 2), first step S41 is repeatedly performed until the execution requirements are met. That is, it is determined whether or not "1" is set at the operation mode switch flag F1. When "1" is set at the operation mode switch flag F1 through the series of processes of FIG. 2, a determination is made at step S41, that "1" has been set at the flag F1, and control proceeds to the subsequent steps S42 to S45. It should be appreciated that the processes at step S42 to S44 are the same as those at steps S22 to S24 of FIG. 3 described above.

At the subsequent step S45, "1" is set at the torque control execution flag F2 upon completion of the initialization in performing the torque control. Specifically, through the process at step S45, it will be determined, at step S42, that "1" has been set at the flag F2. Accordingly, the initialization processes at step S43 onwards of FIG. 7 will no longer be performed.

In the processes of FIG. 8 (torque control 2), first step S51 is repeatedly performed until "1" is determined as being set at the torque control execution flag F2. When "1" is set at the torque control execution flag F2 through the process at step S45 of FIG. 7, it will be determined at this step S51 that "1" has been set at the flag F2, and control then proceeds to the subsequent steps S52 and S53. It should be appreciated that the process at step S52 is the same as that at step S32 of FIG. 4 described above.

Figure 9:
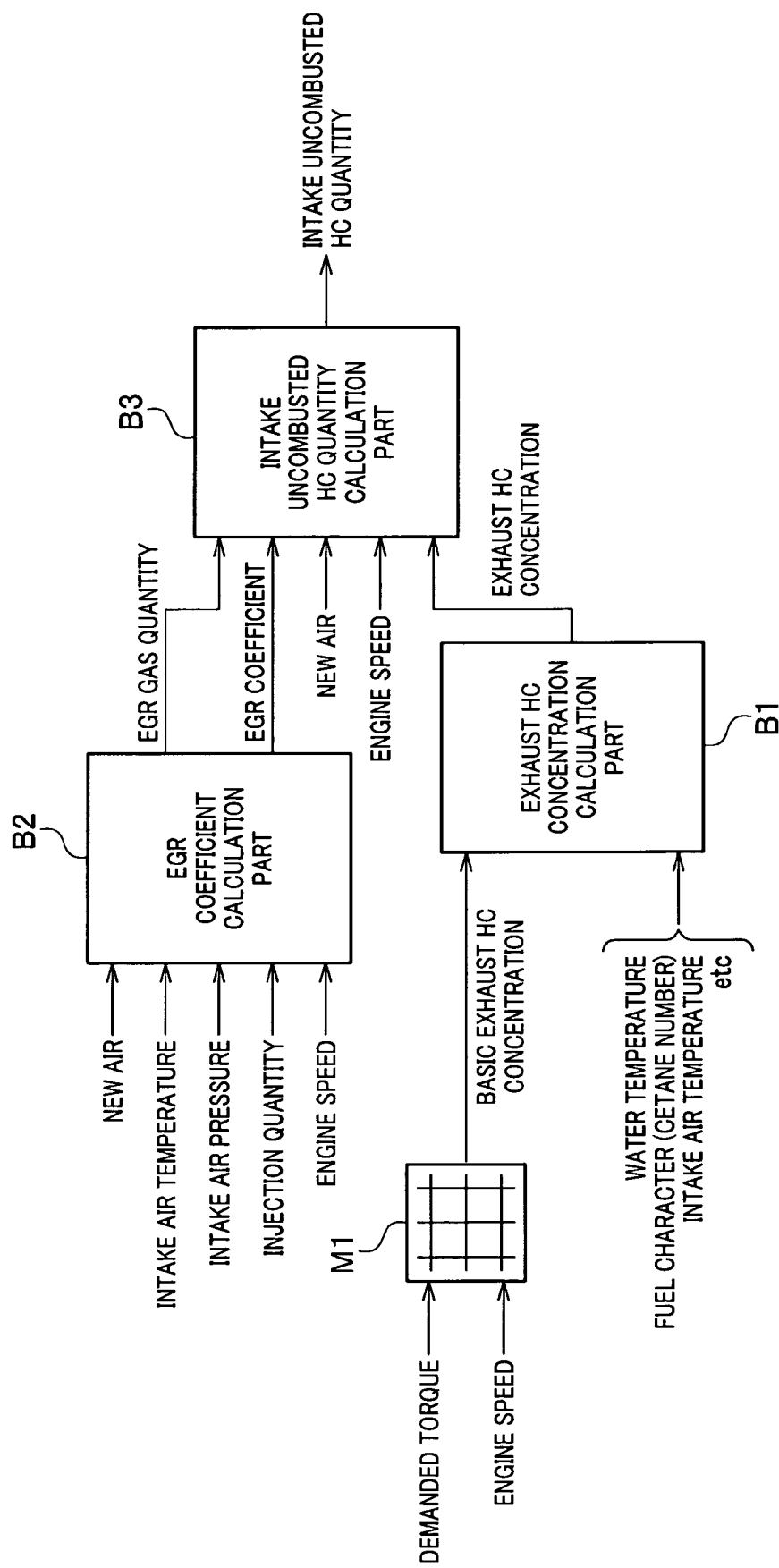
FIG. 9 is a block diagram illustrating functions related, in particular, to an estimation of an uncombusted HC (hydrocarbon) quantity in the intake air, performed by the engine torque control apparatus according to the second embodiment.

At step S53, an amount of uncombusted HC (uncombusted HC quantity in the intake air) is estimated, which is mixed into the intake air with the driving of the EGR valve 62 at step S44 of FIG. 7. Particularly, the uncombusted HC quantity in the intake air is estimated on the basis of the configuration shown in FIG. 9. Referring now to FIG. 9, the estimation on the uncombusted HC quantity in the intake air will be described in detail. FIG. 9 is a block diagram illustrating functions associated with the estimation, in particular, on the uncombusted HC quantity in the intake air performed by the ECU 80. These blocks are basically realized by programs (which are stored in the ROM, for example).

As shown in FIG. 9, in performing the estimation processes, an HC concentration (basic HC concentration in the exhaust gas (hereinafter is referred to as "exhaust HC concentration)) is estimated using a given map M1. In the map M1, estimated values of the exhaust HC concentration obtained through experiments, for example, are written covering every engine speed and every demanded torque.

In an exhaust HC concentration calculation part B1 (e.g., part performing calculation using a given mathematical formula or the like), the basic exhaust HC concentration estimated by the map M1 is subjected to compensation calculation with respect to predetermined environmental factors (e.g., cooling water temperature, fuel character (cetane number) and intake air temperature in the engine 10). Thus, an HC concentration in the exhaust gas (exhaust HC concentration) can be obtained.

Meanwhile, in an EGR coefficient calculation part B2, an EGR coefficient (percentage of an EGR gas returned to the combustion chamber 16 for the entire exhaust gas) and an EGR gas quantity are calculated on the basis, for example, of the new air amount (detected by the airflow meter 32), intake air temperature (detected by the intake air temperature sensor 35), intake air pressure (detected by the intake air pressure sensor 36), injection quantity and engine speed. It should be appreciated that the calculation performed by the EGR coefficient calculation part B2 is programmed on the basis, for example, of a predetermined physics model (EGR model).

In an intake uncombusted HC quantity calculation part B3 (e.g., part performing calculation using a given mathematical formula or the like), an intake uncombusted HC quantity, i.e. a quantity of uncombusted HC (which is mixed into the intake air by the driving of the EGR valve 62 at step S44 of FIG. 7) contained in the intake air of the time is calculated on the basis of the EGR coefficient and EGR gas quantity calculated by the EGR coefficient calculation part B2, the exhaust HC concentration calculated by the exhaust HC concentration calculation part B1 as well as the amount of new air and engine speed. In particular, the larger the EGR coefficient and the EGR gas quantity are, and the larger the exhaust HC concentration is, the larger the value of the intake uncombusted HC quantity will be, which value is obtained by the calculation here.

In the present embodiment, the intake uncombusted HC quantity (recirculated HC quantity) is estimated, at step S53 of FIG. 8, through the process model described above. At the subsequent step S54, the engine operation conditions (e.g., engine speed) and demanded torque are obtained. At the subsequent step S55, a target injection timing (instruction value) of fuel for the combustion chamber 16 is calculated on the basis of the engine speed, demanded torque and the recirculated HC quantity. In particular, the calculation is performed using a predetermined map (stored in the ROM, for example) in which appropriate values for target injection timing are written covering every engine speed, every demanded torque and every recirculated HC quantity (or by using a mathematical formula).

At the subsequent step S56, the recirculated HC quantity estimated at the previous step S53 is compared with a predetermined determination value A1 (e.g., fixed value, or variable value may be possible) to determine whether or not a relation "recirculated HC quantity≦determination value A1" is satisfied, that is, whether or not the recirculated HC quantity has been sufficiently decreased. Unless the relation "recirculated HC quantity≦determination value A1" is satisfied at step S56, torque control with the contents of steps S53 to S55 are repeatedly executed.

When it is determined, at step S56, that the relation "recirculated HC quantity≦determination value A1" is satisfied, the torque control is regarded as having been terminated and "0" is set at the control execution flag F2 at the subsequent step S57. Accordingly, it will be determined, at the previous step S51, that "1" is not set at the flag F2, and thus the processes of step S52 onwards will no longer be performed.

Figure 10:
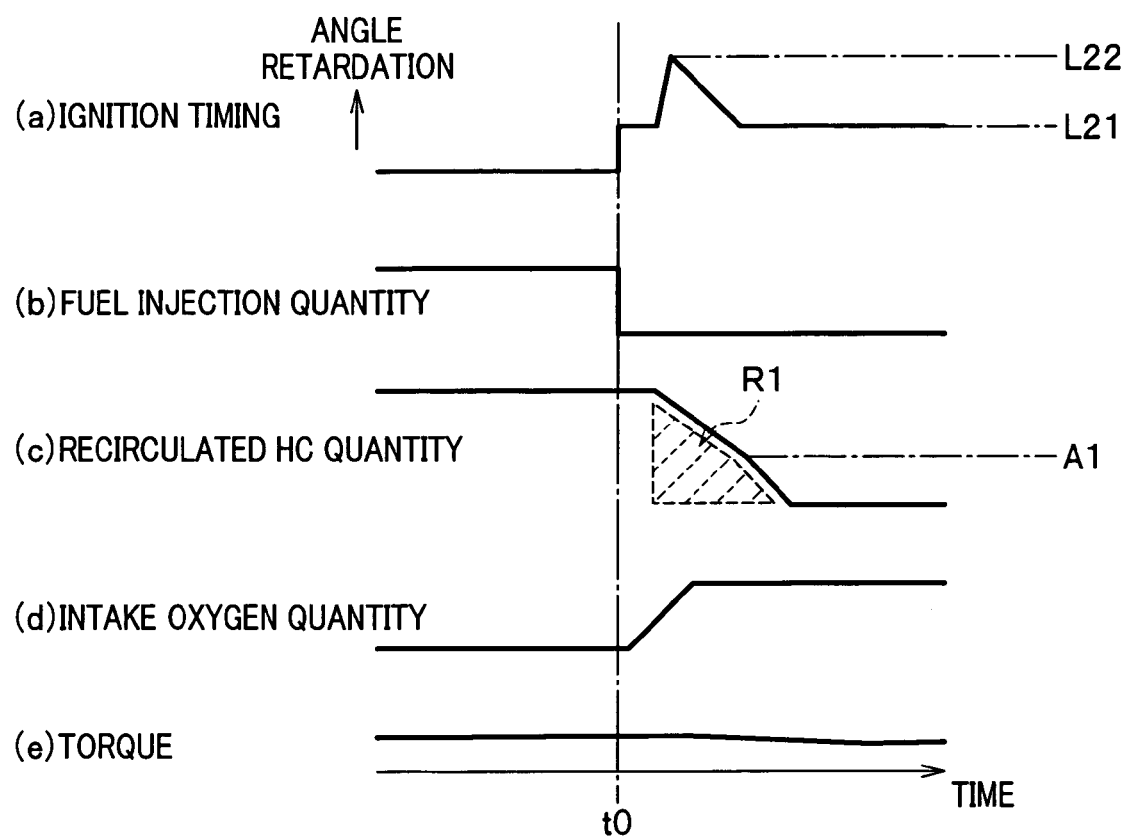
FIG. 10 shows timing diagrams, each illustrating an operation mode of the apparatus according to the second embodiment.

Referring now to FIG. 10, hereinafter is described an operation mode of the engine torque control apparatus (ECU 80) according to the present embodiment. FIG. 10(a) is a timing diagram illustrating transition of ignition timing (correlated to injection timing). FIG. 10 shows timing diagrams corresponding to FIG. 6, respectively.

As shown in charts (a)-(e) of FIG. 10, the apparatus according to the present embodiment is configured such that the torque control described above (see FIG. 8) is performed immediately after the timing (timing t0) of the operation mode switching (determined through the processes of FIG. 2) to suppress torque from being increased by the turn-round (see region R1 in FIG. 10(c)) of the uncombusted fuel (HC) described above. In other words, torque increase is cancelled by having the fuel ignition timing delayed for the combustion in the engine 10. In particular, at step S55 of FIG. 8, for example, a fuel injection timing pattern (temporally changing fuel injection timing) may be calculated using a map (adjustment map) prepared in advance through experiments, for example, on the basis of the temporally changing turn-around pattern (transition of the recirculated HC quantity estimated at step S53) of the uncombusted fuel (HC). Then, by variably controlling valve-opening timing of the injector 27 according to thus calculated fuel injection timing, the fuel ignition timing for the combustion in the engine 10 may be controlled. Specifically, as shown in FIG. 10(a), the ignition timing subjected to advance angle control in order to perform rich purge, is restored to an ignition timing L21 for steady operation at the time of switching operation mode (timing t0), which is immediately followed by retarding the angle so as to be in conformity with an ignition timing L22. Then, the fuel ignition timing is continuously subjected to retardation angle control by gradually transferring the ignition timing to the side of retardation angle, until the recirculated HC quantity is determined as having been sufficiently decreased (lower than the determination value A1) at step S56 of FIG. 8 described above. Thus, as shown in FIG. 10(d), the decreased torque resulting from the decrease control of the process at step S55 may come to cancel the increased torque described above, and thus may come to suppress the torque fluctuation (torque shock) at the time of switching the operation mode.

As described above, the engine torque control apparatus according to the present embodiment can provide the following advantages in addition to the advantages similar to or based on those provided at the above items (1) to (3), (5) and (6).

(8) The engine torque control apparatus is so configured that, at steps S53 to S55 of FIG. 8, the fuel ignition timing is retarded (practically, the fuel injection timing is subjected to variable control for angle retardation) for the combustion in the engine 10 to perform variable control of torque generated through the combustion. Thus, torque control can be readily performed in an accurate manner.

(9) The engine torque control apparatus is configured by providing a program (recirculation quantity obtaining means, see FIG. 9) for estimating the temporarily changing quantity of uncombusted fuel recirculated by the EGR system 60, on the basis of the operation conditions of the engine 10. Then, the apparatus is so configured that a control target value of the fuel injection timing (torque parameter) is determined at step S55 of FIG. 8 on the basis of the recirculated HC quantity estimated by the program shown in FIG. 9. Such a configuration can facilitate the matching of the increase/decrease pattern of the recirculated HC quantity (and thus the increase/decrease pattern of the torque caused by the recirculated HC quantity) with the increase/decrease pattern of the instant torque of the engine output for cancellation of the both.

(10) As shown in FIG. 9, the program for estimating the temporarily changing quantity of uncombusted fuel recirculated by the EGR system 60 can be effectively configured by including a part for calculating an EGR coefficient of the EGR system 60 (the EGR coefficient calculation part B2), and a part for calculating the HC quantity (exhaust HC concentration) in the exhaust gas of the engine (the map M1 and the exhaust HC concentration calculation part B1). Such a configuration can facilitate high-accuracy estimation of the recirculated HC quantity.

Third Embodiment

Hereinafter will be described a third embodiment to which the engine torque control apparatus of the present invention is applied. In the present embodiment, the identical or similar components to those in the first embodiment are given the same reference numerals for the sake of omitting explanation. Similar to the first embodiment, the apparatus of the present embodiment is also basically applied to an engine control system as shown in FIG. 1. In the apparatus of the present embodiment, however, the configurations of the programs provided in the ECU 80 are partially different. In the present embodiment, the description will be focused on the differences from the apparatus of the first and second embodiments.

Figure 11:
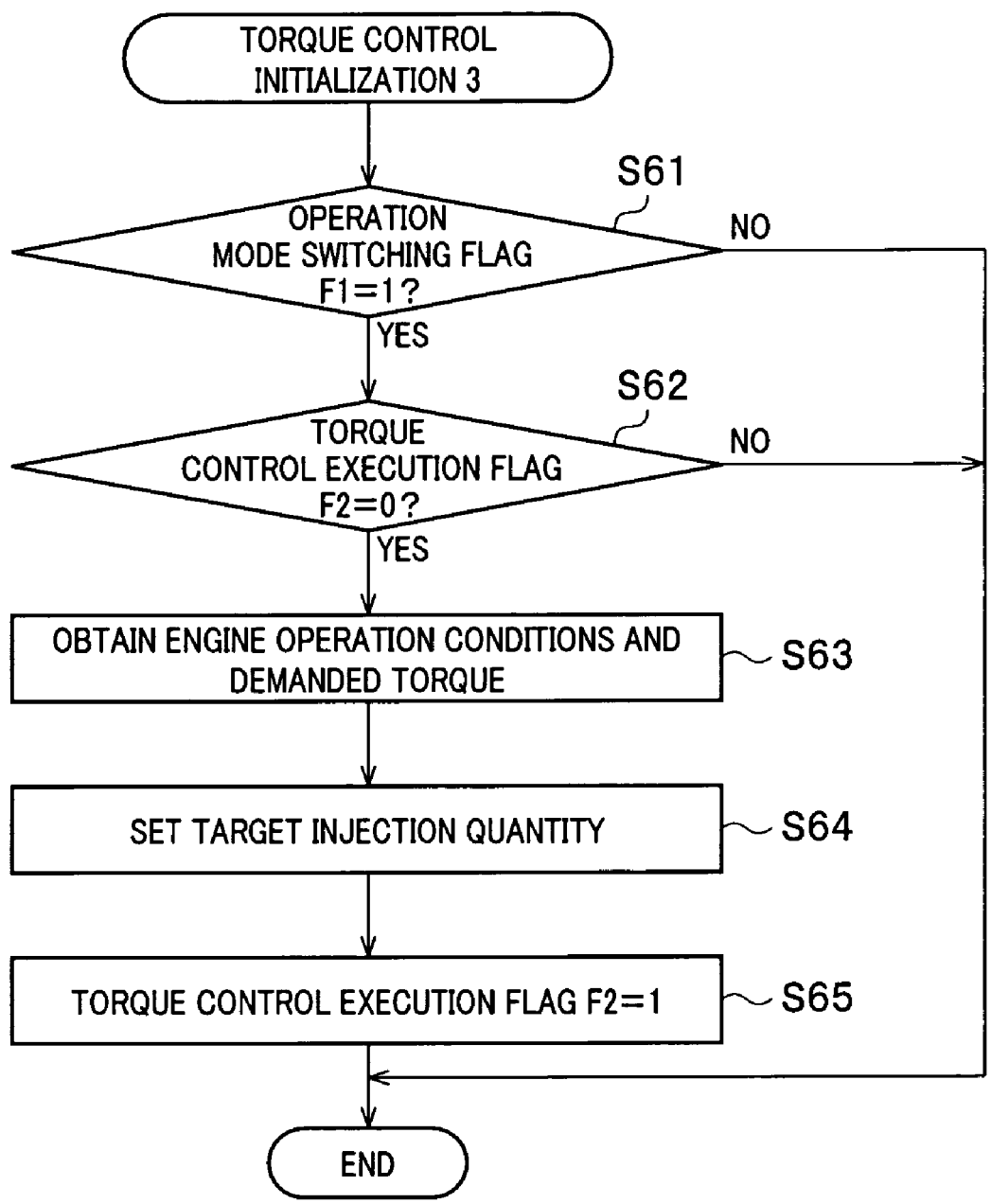
FIG. 11 is a flow diagram illustrating a process procedure for initializing torque control performed by an engine torque control apparatus according to a third embodiment of the present invention.
Figure 12:
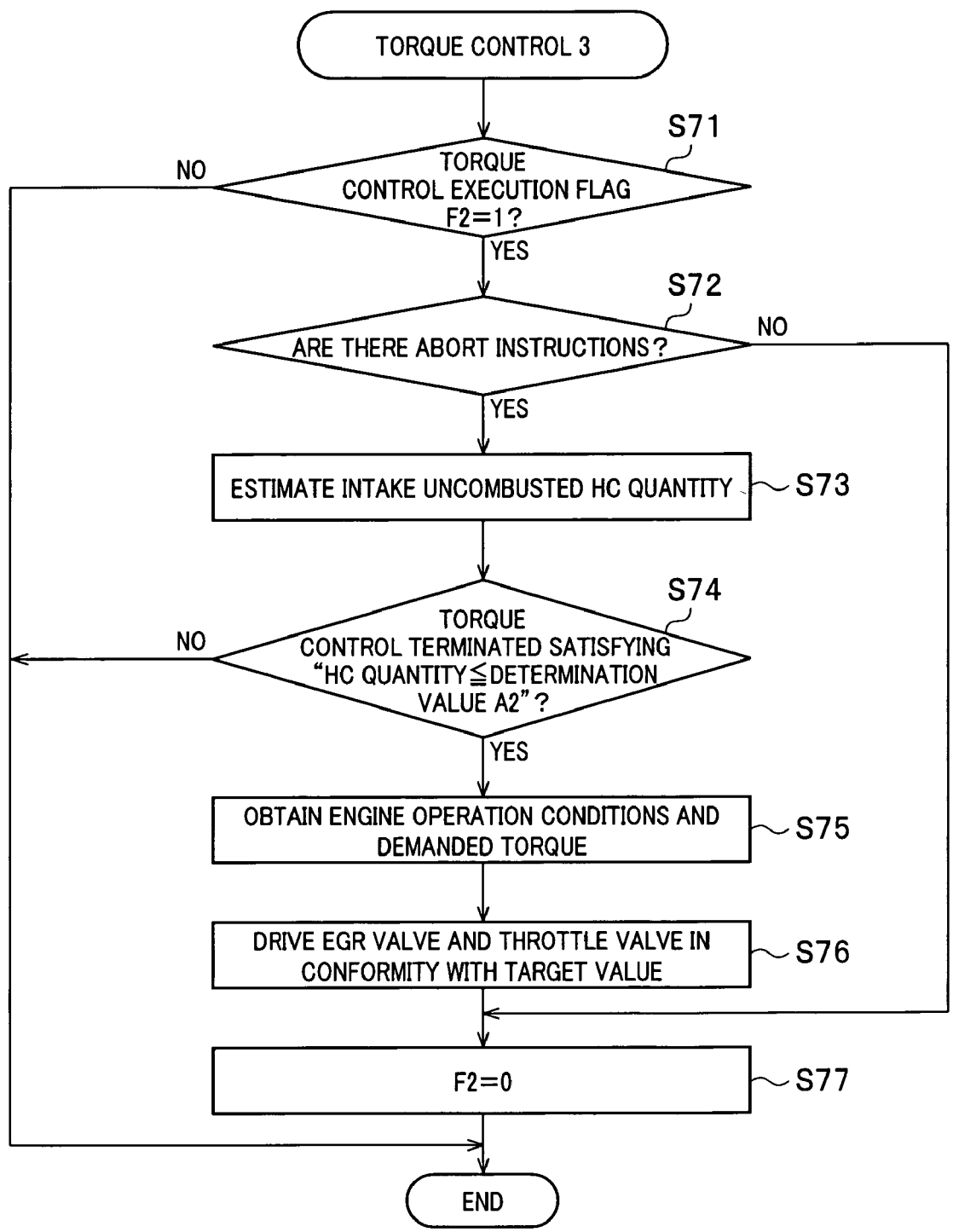
FIG. 12 is a flow diagram illustrating the contents of the torque control according to the third embodiment.
Figure 13:
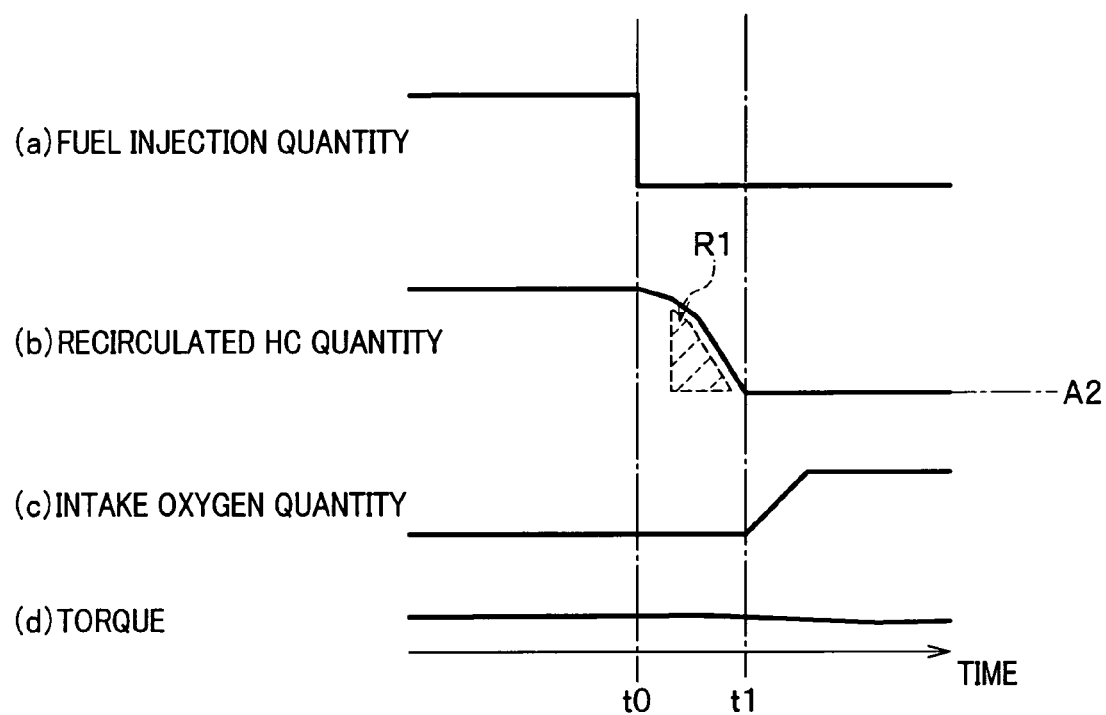
FIG. 13 shows timing diagrams, each illustrating an operation mode of the apparatus according to the third embodiment.

Referring to FIGS. 11 to 13, hereinafter is described the torque control associated with the present embodiment.

FIGS. 11 and 12 are flow diagrams illustrating the process procedures of the torque control. In the torque control of the present embodiment, satisfactoriness of the execution requirements for the so torque control is also determined through the processes of FIG. 2. Only when the execution requirements are determined as being met through the processes of FIG. 2, initialization (torque control initialization 3) of the torque control and contents of the control (torque control 3) are executed as a series of processes shown in FIGS. 11 and 12. Basically, the series of processes of FIGS. 7 and 8 are also successively executed at every predetermined crank angle or at every predetermined temporal cycle (e.g., every combustion cycle) by having the programs stored in the ROM of the ECU 80 executed. The parameters used in the processes of each of the figures are also continually stored the memory units, such as the RAM and the EEPROM, provided in the ECU 80 and renewed as required. As to the processes of FIG. 2 described above, the description is omitted here. Hereinafter, those points different from the first embodiment are chiefly described in detail for the processes of FIGS. 11 and 12.

As shown in the processes of FIG. 11 (torque control initialization 3), first step S61 is repeatedly performed until the execution requirements are met. That is, it is determined whether or not "1" is set at the operation mode switch flag F1. When "1" is set at the operation mode switch flag F1 through the series of processes of FIG. 2, a determination is made at step S61, that "1" has been set at the flag F1, and control proceeds to the subsequent steps S62 to S65. It should be appreciated that the processes at step S62 and S63 are the same as those at steps S22 and 523 of FIG. 3 described above.

At step S64, a command value of an injection quantity to be injected and supplied to the injector 27 per one combustion cycle (720° CA) (target injection quantity) is calculated and set on the basis of the engine speed and the demanded torque obtained at the previous step S63. In particular, the command value is calculated using a given map, for example, in which adjustment values of fuel injection quantity are written covering every engine speed and every demanded torque by conducting experiments, for example (or by using a mathematical formula). On the basis of the calculated target injection quantity, a command value for fuel injection quantity is set, and the command value (driving time period) is outputted to the injector 24.

At the subsequent step S65, "1" is set at the torque control execution flag F2 upon completion of the initialization in performing the torque control. Specifically, through the process at step S65, it will be determined, at step S62, that "1" has been set at the flag F2. Accordingly, the initialization processes at step S63 onwards of FIG. 11 will no longer be performed.

In the processes of FIG. 12 (torque control 3), first step S71 is repeatedly performed until "1" is determined as being set at the torque control execution flag F2. When "1" is set at the torque control execution flag F2 through the process at step S73 of FIG. 12, it will be determined at this step S71 that "1" has been set at the flag F2, and control then proceeds to the subsequent steps S72 and S74. It should be appreciated that the processes at steps S72 and S73 are the same as those at steps S52 and S53 of FIG. 8 described above.

At step S74, the recirculated HC quantity estimated at the previous step S73 is compared with a predetermined determination value A2 (e.g., fixed value, or variable value may be possible) to determine whether or not a relation "recirculated HC quantity≦determination value A2". That is, it is determined whether or not the recirculated HC quantity has been sufficiently decreased. Then, the processes of steps S71 to S74 are repeatedly executed until the relation "recirculated HC quantity≦determination value A2" is determined as having been established.

When it is determined, at step S74, that the relation "recirculated HC quantity≦determination value A2" has been established, the engine operation conditions (e.g., engine speed) and demanded torque at the time are obtained at the subsequent step S75. At the subsequent step S76, target values for the opening angles of the throttle valve 34 and the EGR valve 62 are set on the basis of the obtained engine speed and demanded torque. Then, the throttle valve 34 and the EGR valve 62 are driven so as to be in conformity with the target values (target opening angles). The target values of the opening angles may be obtained by using a given map in which adjustment values obtained through experiments, for example, are written (or by using a given mathematical formula). The map used for steady operation may also be used as this map.

The torque control is completed with the process at step S76. Accordingly, at the subsequent step S77, "0" is set at the torque control execution flag F2. In this way, it will be determined at the previous step S71, that "1" is not set at the flag F2, and the process of step S72 onwards will no longer be performed.

Referring to charts (a)-(d) of FIG. 13, hereinafter will be described an operation mode of the engine torque control apparatus (ECU 80) according to the present embodiment. FIG. 13 shows timing diagrams corresponding to FIG. 6.

As shown in FIG. 13, the apparatus of the present embodiment is so configured that the turn-around (region R1 in FIG. 13(b)) of the uncombusted fuel (HC) described above is suppressed from being increased, by performing the torque control (see FIG. 12) described above immediately after the timing (timing t0) of switching the operation mode (determined in the processes of FIG. 12). Specifically, after executing the process of fuel reduction (step S64 of FIG. 11), the oxygen quantity increasing process (step S76 of FIG. 12) is started at a predetermined start timing (timing t1) to thereby suppress increase of the torque. More specifically, the oxygen quantity increasing process is delayed, at the previous step S74 of FIG. 12, until delay time (period from t0 to t1) corresponding to the determination value A2 elapses from the time (timing t0) of switching the operation mode. In other words, as shown in FIG. 13(a), the injection quantity that has been increased for rich purge is restored to the injection quantity for steady operation at the time (timing t0) of switching the operation mode. Then, after having elapsed the waiting period (delay time) correlated to the determination value A2 (see FIG. 13(b)) at step S74 of FIG. 12, the throttle valve 34 and the EGR valve 62 are driven at the timing t1 in the process of the subsequent step S76. Thus, the intake oxygen quantity (roughly correlated to new air quantity) is also restored to the oxygen quantity for the steady operation.

In this way, as shown in FIG. 13(d), the engine 10 (the inside of the cylinder 12) may suffer from oxygen deficiency (lack of oxygen) during the period of t0 to t1 immediately after switching the operation mode. As a result, the HC that has turned around (that has been recirculated) upon switching of the air-fuel ratio, or the fuel at the time of combustion at the rich air-fuel ratio before the switching of the air-fuel ratio, which has remained intact, will be discharged without being used for combustion. Thus, the torque increase (the region R1a in FIG. 5(d)) induced by the recirculation of the HC in the intake air can be suppressed, and thus the torque fluctuation (torque shock) triggered by switching the operation mode can be suppressed.

As described above, the engine torque control apparatus according to the present embodiment can provide the following beneficial advantages.

(11) The engine torque control apparatus (ECU 80) is configured by providing a program (air-fuel ratio changing means, step S64 of FIG. 11 and step S76 of FIG. 12) for changing the air-fuel ratio of the engine 10 from an air-fuel ratio for rich purge (first air-fuel ratio) to a leaner air-fuel ratio for steady operation (second air-fuel ratio) in a binary manner by decreasing the fuel quantity and increasing the oxygen quantity. In changing the air-fuel ratio described above, the engine torque control apparatus is adapted to execute (timing t0 of FIG. 13(a)) the fuel quantity decreasing process at step S64 of FIG. 11, followed by starting the oxygen quantity increasing process at step S76 of FIG. 12 when the predetermined start timing (timing t1 of FIG. 13(c)) has come. Thus, the torque fluctuation (torque increase in the present embodiment) immediately after changing the air-fuel ratio is suppressed, and thus the drivability mentioned above ascribed to the torque fluctuation is suppressed from being deteriorated.

(12) The engine torque control apparatus is configured by providing a program (recirculation quantity obtaining means, step S73 of FIG. 12) for obtaining the temporarily changing quantity of HC recirculated by the EGR system 60, and a program for setting the start timing (timing t0 in FIG. 13(c)) for the oxygen quantity increasing process on the basis of the fact that the obtained recirculated HC quantity has become sufficiently small (start timing setting means, step S74 of FIG. 12). Thus, the start timing for the oxygen quantity increasing process can be appropriately set. Specifically, for example, the start timing can be set at a point immediately after just discharging all the residual fuel for the combustion at the rich air-fuel ratio (first air-fuel ratio).

(13) The engine torque control apparatus is so configured that, at step S64 of FIG. 11 and at step S76 of FIG. 12, the air-fuel ratio can be changed in a binary manner from the rich air-fuel ratio (for rich purge) which is a predetermined air-fuel ratio richer than a theoretical air-fuel ratio, to the lean air-fuel ratio (for steady operation) which is a predetermined air-fuel ratio leaner than a theoretical air-fuel ratio. Such a configuration enables accurate suppression of the torque fluctuation (torque increase in the present embodiment) which is particularly likely to occur at the time of changing the air-fuel ratio from rich to lean.

Other Embodiments

The embodiments provided above may be implemented with the following modifications.

In the configuration of the first embodiment, a program as exemplified in FIG. 9 may be provided for obtaining the recirculated HC quantity. Also, in the configurations of the second and third embodiments, a map similar to the one in the first embodiment may be used instead of such a program.

The configuration for obtaining the recirculated HC quantity is not limited to the program exemplified in FIG. 9, but may be appropriately changed according use or the like. For example, the configuration may be such that the HC quantity is directly detected by providing an HC sensor at an intake port.

In the first and second embodiments, the torque variable control (processes of FIGS. 4 and 8) has been adapted to be performed according to the injection quantity or the fuel injection timing. However, without limiting to this, other parameters may be used if they are the ones for increasing/decreasing output torque (shaft torque) of the engine 10. Specifically, without limiting to the parameters for increasing/decreasing torque, it is also possible to use a parameter, for example, for increasing/decreasing a load quantity or the like that works on the output shaft (crank shaft) of the engine.

The embodiments described above may be configured by providing a program (EGR determining means) for determining whether or not the exhaust gas is in a recirculation condition, that is, a condition where the exhaust gas can be partially recirculated to the intake passage by the EGR system 60 (e.g., condition where the EGR valve 62 is not fully open). The torque variable control (processes of FIGS. 4, 8 and 12) described above may be performed only when it is determined that the exhaust gas is in the recirculation condition. Thus, unnecessary control can be eliminated to simplify the torque control.

The embodiments described above have been configured by providing a program for detecting the timing t0 for changing the air-fuel ratio (step S1 of FIG. 2) when the registered operation mode is terminated. However, without limiting to this, the apparatus may be configured by alternatively providing a program for detecting the timing t0 for changing the air-fuel ratio when, for example, the registered operation mode is started. Alternatively, the change of the air-fuel ratio may be directly detected by using, for example, an oxygen concentration sensor (an A/F sensor or an $O_2$ sensor), while using an alternative program for detecting the timing t0 for changing the air-fuel ratio on the basis of the output o of the sensor. Alternatively, the apparatus may be configured to detect the timing t0 for changing the air-fuel ratio in response to the timing of giving instructions to the actuators (e.g., the injector 27, the throttle valve 34 and the ETR valve 62) associated with the air-fuel ratio control. The point is that the mode for detecting the timing t0 for changing the air-fuel ratio can be optionally selected.

The embodiments described above have been so configured that the torque variable control (processes of FIGS. 4, 8 and 12) is performed when the air-fuel ratio of the engine 10 is changed in a binary manner from the rich air-fuel ratio (richer than a theoretical air-fuel ratio) to the lean air-fuel ratio (leaner than a theoretical air-fuel ratio). Without limiting to this, however, it may be effective, depending on the use of the engine torque control apparatus, to configure the apparatus so as to perform the torque variable control (processes of FIGS. 4, 8 and 12) described above when, for example, the air-fuel ratio is changed in a binary manner from a predetermined rich air-fuel ratio to a less rich air-fuel ratio, or when the air-fuel ratio is changed in a binary manner from a predetermined lean air-fuel ratio to a less lean air-fuel ratio.

The embodiments described above have been configured to calculate demanded torque. However, a configuration without this calculation may be provided. For example, the apparatus may be configured so that, the manipulated variable of acceleration pedal can be used as it is alternative to the demanded torque.

The point is that the advantages of the degree provided at items (1) and (11) can be achieved, if only the engine torque control apparatus is provided with a program for controlling the output torque of the engine 10 when the air-fuel ratio is controlled to a leaner air-fuel ratio to suppress or cancel the torque which is ascribed to the recirculation of HC (uncombusted fuel) contained in the exhaust gas into the intake air by the EGR system 60 (EGR means).

In the embodiments and modifications described above, it has been assumed that various types of software (programs) are used. However, similar functions may be ensured to be realized by using hardware, such as a dedicated circuit.

In the embodiments and modifications described above, the description has been provided referring to a case, as an example, where the present invention is applied to a diesel engine. However, the present invention can also be basically applied, in the similar manner, to spark-ignition gasoline engines (including direct-ignition engines).

What is claimed is:

1. An engine torque control apparatus which is applied to an engine control system comprising an engine for rotating an output shaft by using torque generated through combustion in cylinders, and EGR (exhaust gas recirculation) means for partially recirculating exhaust gas passing through an exhaust passage of the engine into an intake passage of the engine, the apparatus comprising:
   obtaining means for obtaining torque parameters for increasing/decreasing output torque of the engine; and
   torque changing means for conducting variable control when an air-fuel ratio indicating a proportion between air and fuel supplied into the cylinders of the engine is changed to a leaner air-fuel ratio, so that the torque parameters is variably controlled in such a way that torque fluctuation associated with a temporarily changing recirculated uncombusted fuel quantity, which is a quantity of uncombusted fuel recirculated by the EGR means, is cancelled in a manner suitable for the temporarily changing recirculated uncombusted fuel quantity, at least during a predetermined period immediately after timing for changing the air-fuel ratio.

2. The engine torque control apparatus according to claim 1, comprising recirculation quantity obtaining means for obtaining the temporarily changing recirculated uncombusted fuel quantity, which is a quantity of uncombusted fuel recirculated by the EGR means,
   wherein the torque changing means determines a control target value for each of the torque parameters on the basis of the recirculated uncombusted fuel quantity obtained by the recirculation quantity obtaining means.

3. The engine torque control apparatus according to claim 2, wherein the recirculation quantity obtaining means comprises a part for calculating an EGR coefficient of the EGR means and a part for calculating an uncombusted fuel quantity in the exhaust gas of the engine.

4. The engine torque control apparatus according to claim 3, wherein the torque changing means once controls each of the torque parameters, immediately after the air-fuel ratio changing timing, to a torque-decreasing value which is lower than a value for steady operation of the engine, and then changes the value to the value for steady operation spending a predetermined time period.

5. The engine torque control apparatus according to claim 4, wherein the torque changing means performs variable control of the torque parameters when the air-fuel ratio of the engine is changed in a binary manner from a predetermined rich air-fuel ratio which is richer than a theoretical air-fuel ratio to a predetermined lean air-fuel ratio which is leaner than a theoretical air-fuel ratio.

6. The engine torque control apparatus according to claim 5, wherein the torque changing means performs the torque variable control by decreasing a fuel quantity for the combustion in the engine.

7. The engine torque control apparatus according to claim 5, wherein the torque changing means performs the torque variable control by retarding fuel ignition timing for the combustion in the engine.

8. The engine torque control apparatus according to claim 6, comprising EGR determining means for determining whether or not the exhaust gas is in a recirculation state where the exhaust gas can be partially recirculated to the intake passage by the EGR means,
   wherein the torque changing means performs the torque variable control only when the EGR determining means has determined that the exhaust gas is in the recirculation state.

9. The engine torque control apparatus according to claim 7, comprising EGR determining means for determining whether or not the exhaust gas is in a recirculation state where the exhaust gas can be partially recirculated to the intake passage by the EGR means,
   wherein the torque changing means performs the torque variable control only when the EGR determining means has determined that the exhaust gas is in the recirculation state.

10. The engine torque control apparatus according to claim 1, wherein the torque changing means once controls each of the torque parameters, immediately after the air-fuel ratio changing timing, to a torque-decreasing value which is lower than a value for steady operation of the engine, and then changes the value to the value for steady operation spending a predetermined time period.

11. The engine torque control apparatus according to claim 1, wherein the torque changing means performs variable control of the torque parameters when the air-fuel ratio of the engine is changed in a binary manner from a predetermined rich air-fuel ratio which is richer than a theoretical air-fuel ratio to a predetermined lean air-fuel ratio which is leaner than a theoretical air-fuel ratio.

12. The engine torque control apparatus according to claim 1, wherein the torque changing means performs the torque variable control by decreasing a fuel quantity for the combustion in the engine.

13. The engine torque control apparatus according to claim 1, wherein the torque changing means performs the torque variable control by retarding fuel ignition timing for the combustion in the engine.

14. The engine torque control apparatus according to claim 1, comprising EGR determining means for determining whether or not the exhaust gas is in a recirculation state where the exhaust gas can be partially recirculated to the intake passage by the EGR means,
   wherein the torque changing means performs the torque variable control only when the EGR determining means has determined that the exhaust gas is in the recirculation state.

15. An engine torque control apparatus which is applied to an engine control system comprising an engine for rotating an output shaft by using torque generated through combustion in cylinders, and EGR means for partially recirculating exhaust gas passing through an exhaust passage of the engine into an intake passage of the engine, comprising:
   torque control means for controlling output torque of the engine when an air-fuel ratio indicating a proportion between air and fuel supplied into the cylinders of the engine is controlled to a leaner air-fuel ratio, to suppress or cancel torque fluctuation which is ascribed to the recirculation of uncombusted fuel present in the exhaust gas into the intake air by the EGR means.

16. A method for adjusting an engine torque control apparatus, which is applied to an engine control system comprising an engine for rotating an output shaft by using torque generated through combustion in cylinders, and EGR means for partially recirculating exhaust gas passing through an exhaust passage of the engine into an so intake passage of the engine, wherein transition of the recirculated uncombusted fuel quantity, which is a quantity of uncombusted fuel recirculated by the EGR means, is obtained and the transition of the recirculated uncombusted fuel quantity is set at the engine torque control apparatus, during a predetermined period immediately after timing for changing the air-fuel ratio indicating a proportion between air and fuel supplied into the cylinders of the engine to a leaner air-fuel ratio following the operation of the engine control system.

* * * * *

UNITED STATES PATENT AND TRADEMARK OFFICE
CERTIFICATE OF CORRECTION

| | | |
|---|---|---|
| PATENT NO. | : 7,513,245 B2 | Page 1 of 1 |
| APPLICATION NO. | : 11/954303 | |
| DATED | : April 7, 2009 | |
| INVENTOR(S) | : Morimoto et al. | |

It is certified that error appears in the above-identified patent and that said Letters Patent is hereby corrected as shown below:

In the Claims:

Claim 16 at column 23, line 6, delete "so"

Signed and Sealed this

Twenty-eighth Day of July, 2009

JOHN DOLL
*Acting Director of the United States Patent and Trademark Office*